US008776734B1

(12) United States Patent
Roy et al.

(10) Patent No.: US 8,776,734 B1
(45) Date of Patent: Jul. 15, 2014

(54) REMEDIAL SYSTEM: A POLLUTION CONTROL DEVICE FOR UTILIZING AND ABATING VOLATILE ORGANIC COMPOUNDS

(75) Inventors: Michael J. Roy, Newbury Park, CA (US); Lawrence Neill, Camarillo, CA (US)

(73) Assignee: Innovative Environmental Solutions, LLC, Ventura, CA (US)

( * ) Notice: Subject to any disclaimer, the term of this patent is extended or adjusted under 35 U.S.C. 154(b) by 771 days.

(21) Appl. No.: 12/468,789

(22) Filed: May 19, 2009

Related U.S. Application Data

(60) Provisional application No. 61/054,452, filed on May 19, 2008.

(51) Int. Cl.
*F02B 43/00* (2006.01)

(52) U.S. Cl.
USPC .......................................... 123/1 A; 123/1 R

(58) Field of Classification Search
USPC .......................................... 123/1 R, 1 A, 2, 3
See application file for complete search history.

(56) References Cited

U.S. PATENT DOCUMENTS

| | | | | |
|---|---|---|---|---|
| 3,733,780 A | * | 5/1973 | Bellisio et al. ................... | 95/180 |
| 4,319,964 A | * | 3/1982 | Katz et al. ....................... | 202/172 |
| 5,540,057 A | * | 7/1996 | Cheng ............................. | 62/625 |
| 5,706,675 A | * | 1/1998 | Manikowski, Jr. ............... | 62/645 |
| 5,802,840 A | * | 9/1998 | Wolf ............................... | 60/772 |
| 6,055,808 A | * | 5/2000 | Poola et al. ...................... | 60/274 |
| 6,095,101 A | * | 8/2000 | Pedersen ................... | 123/27 GE |
| 6,207,120 B1 | * | 3/2001 | Belmonte et al. .............. | 423/210 |
| 6,467,271 B2 | * | 10/2002 | Youn ................................ | 60/614 |
| 6,742,507 B2 | * | 6/2004 | Keefer et al. .................. | 123/585 |
| 6,981,850 B1 | * | 1/2006 | Maltbie et al. ................. | 417/201 |
| 7,089,888 B2 | * | 8/2006 | Mirji .............................. | 123/1 A |
| 7,197,876 B1 | * | 4/2007 | Kalina ............................ | 60/649 |
| 7,344,789 B2 | * | 3/2008 | Barber et al. .................. | 429/411 |
| 7,370,610 B2 | * | 5/2008 | Ashford et al. .................... | 123/3 |
| 7,594,939 B2 | * | 9/2009 | Goldstein et al. ................. | 48/61 |
| 2004/0011121 A1 | * | 1/2004 | Ashe et al. .................... | 73/118.1 |
| 2004/0166386 A1 | * | 8/2004 | Herman et al. ................. | 429/22 |
| 2005/0132713 A1 | * | 6/2005 | Neary ............................. | 60/784 |
| 2006/0260193 A1 | * | 11/2006 | Ryan et al. .................... | 48/198.1 |
| 2006/0272500 A1 | * | 12/2006 | Keller et al. ..................... | 95/46 |
| 2007/0062853 A1 | * | 3/2007 | Spani ............................ | 210/180 |
| 2007/0065711 A1 | * | 3/2007 | Gopal ............................ | 429/38 |
| 2007/0071657 A1 | * | 3/2007 | Okubo et al. ............. | 422/186.03 |
| 2007/0231233 A1 | * | 10/2007 | Bose .......................... | 423/245.1 |
| 2008/0132405 A1 | * | 6/2008 | Patchett et al. ................. | 502/74 |
| 2009/0283064 A1 | * | 11/2009 | Merritt .......................... | 123/1 A |
| 2010/0024288 A1 | * | 2/2010 | Jimeson et al. ................. | 44/452 |

* cited by examiner

*Primary Examiner* — Noah Kamen
*Assistant Examiner* — Long T Tran
(74) *Attorney, Agent, or Firm* — Christie, Parker & Hale, LLP

(57) ABSTRACT

A remedial pollution control system for treating volatile organic compounds that may include a vapor concentrator connected to a line that is laden with volatile organic compounds, the concentrator has an organic condensate output line and a vapor output line; a mixing chamber adapted to receive air provided from an air supply line, combustible fuel from an alternate fuel supply line, and a vapor stream from the vapor output line to produce a mixed fuel supplied to an internal combustion engine, a control mixing system with a controller for producing a proper air to fuel ratio in the mixed fuel supply, and power generated to operate other devices used to more efficiently abate volatile organic compounds and reduce greenhouse gas emissions.

12 Claims, 12 Drawing Sheets

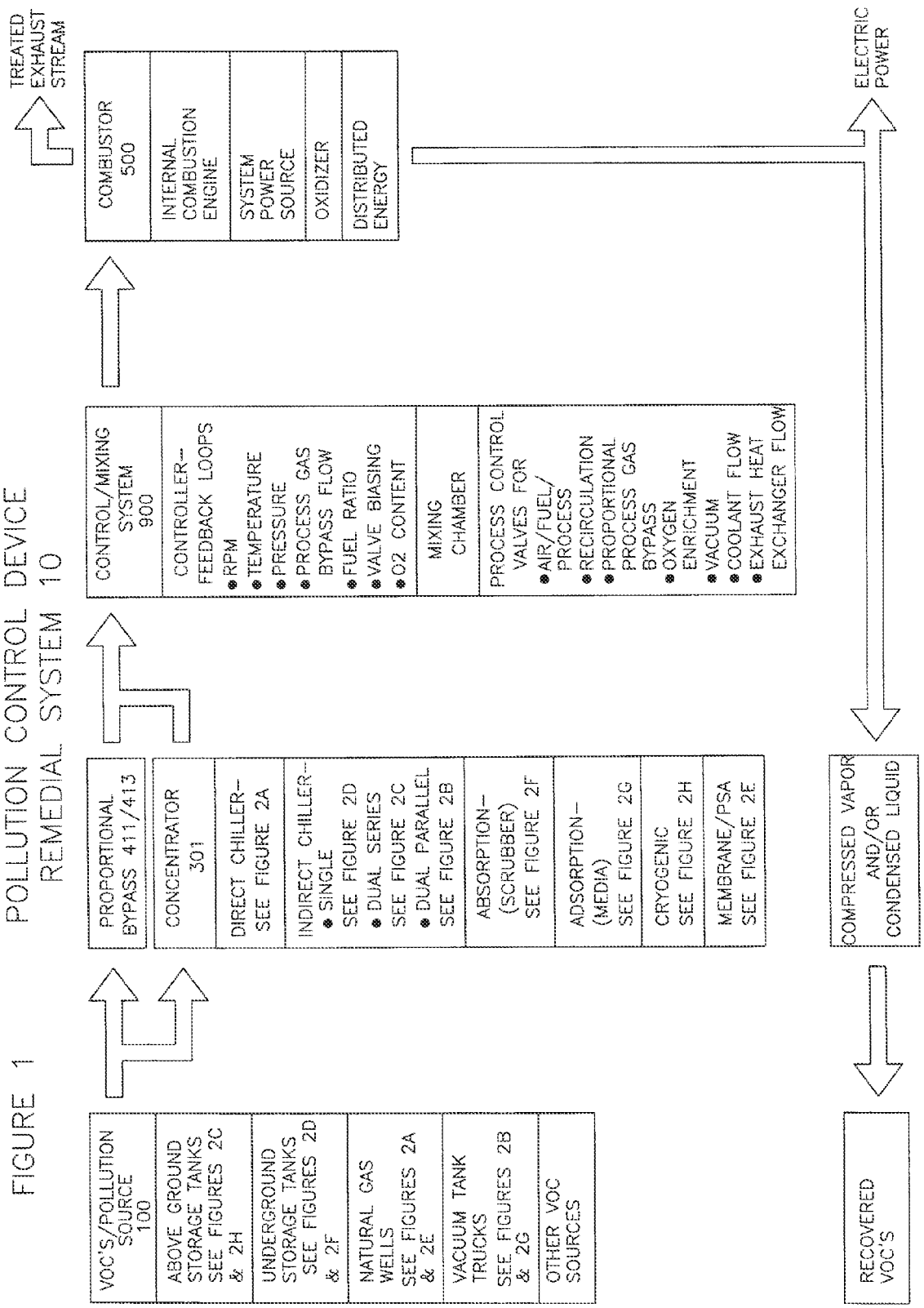

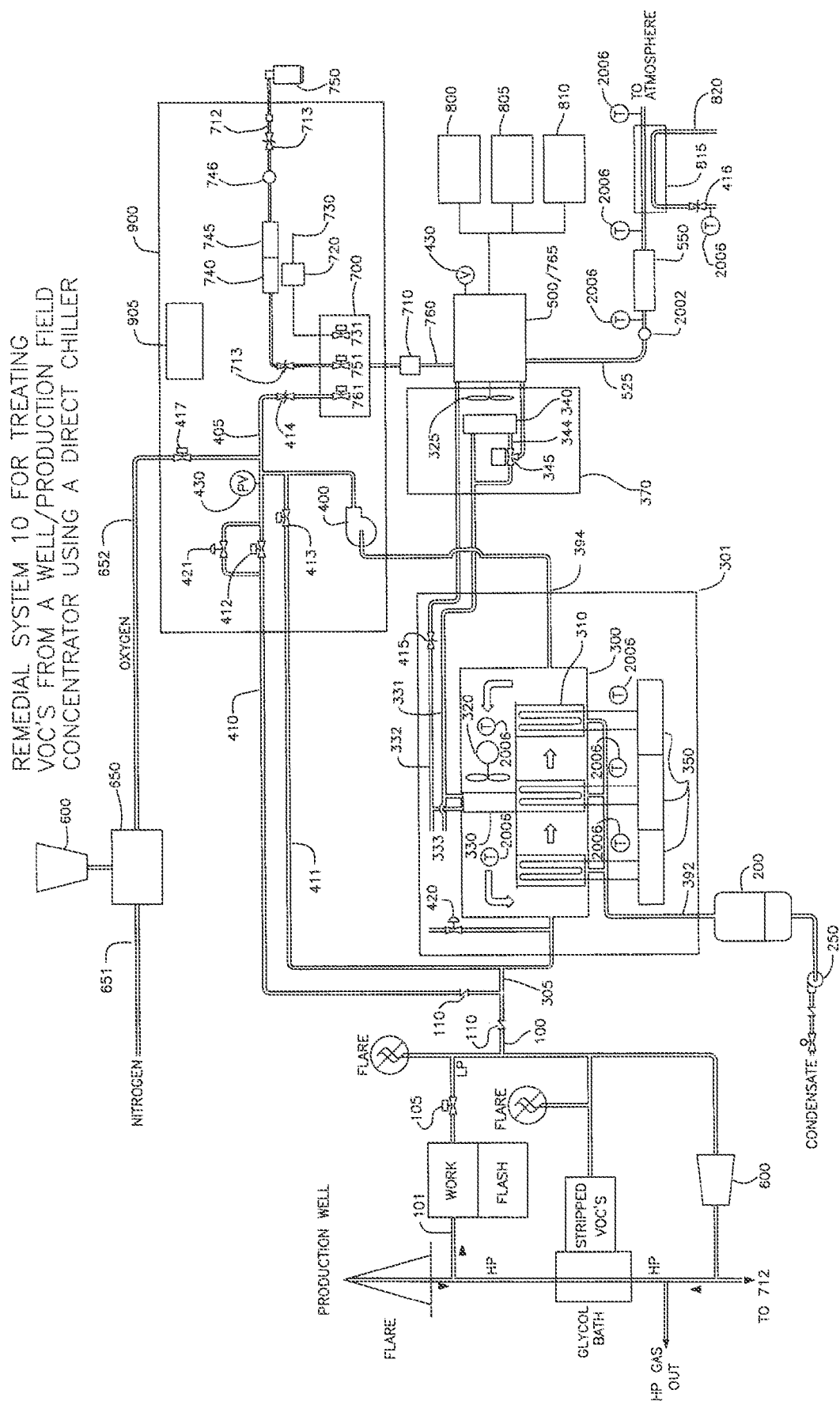

REMEDIAL SYSTEM 10 FOR TREATING VOC'S FROM A VACUUM TANK TRUCK CONCENTRATOR USING DUAL INDIRECT CHILLERS IN PARALLEL

REMEDIAL SYSTEM 10 FOR TREATING VOC'S FROM AN ABOVE GROUND STORAGE TANK CONCENTRATOR USING DUAL INDIRECT CHILLERS IN SERIES

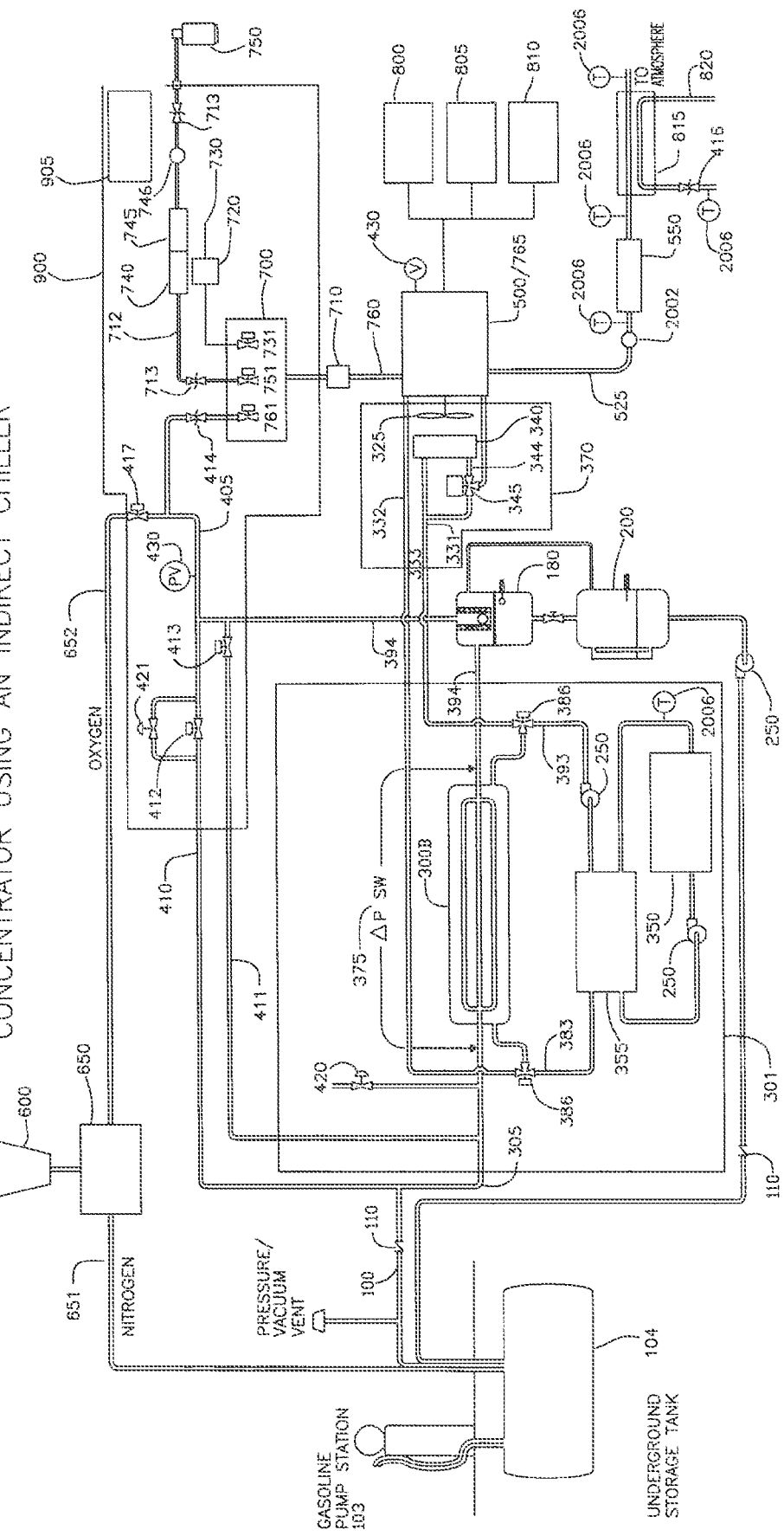

REMEDIAL SYSTEM 10 FOR TREATING VOC'S FROM A WELL/PRODUCTION FIELD CONCENTRATOR USING A MEMBRANE/PSA UNIT

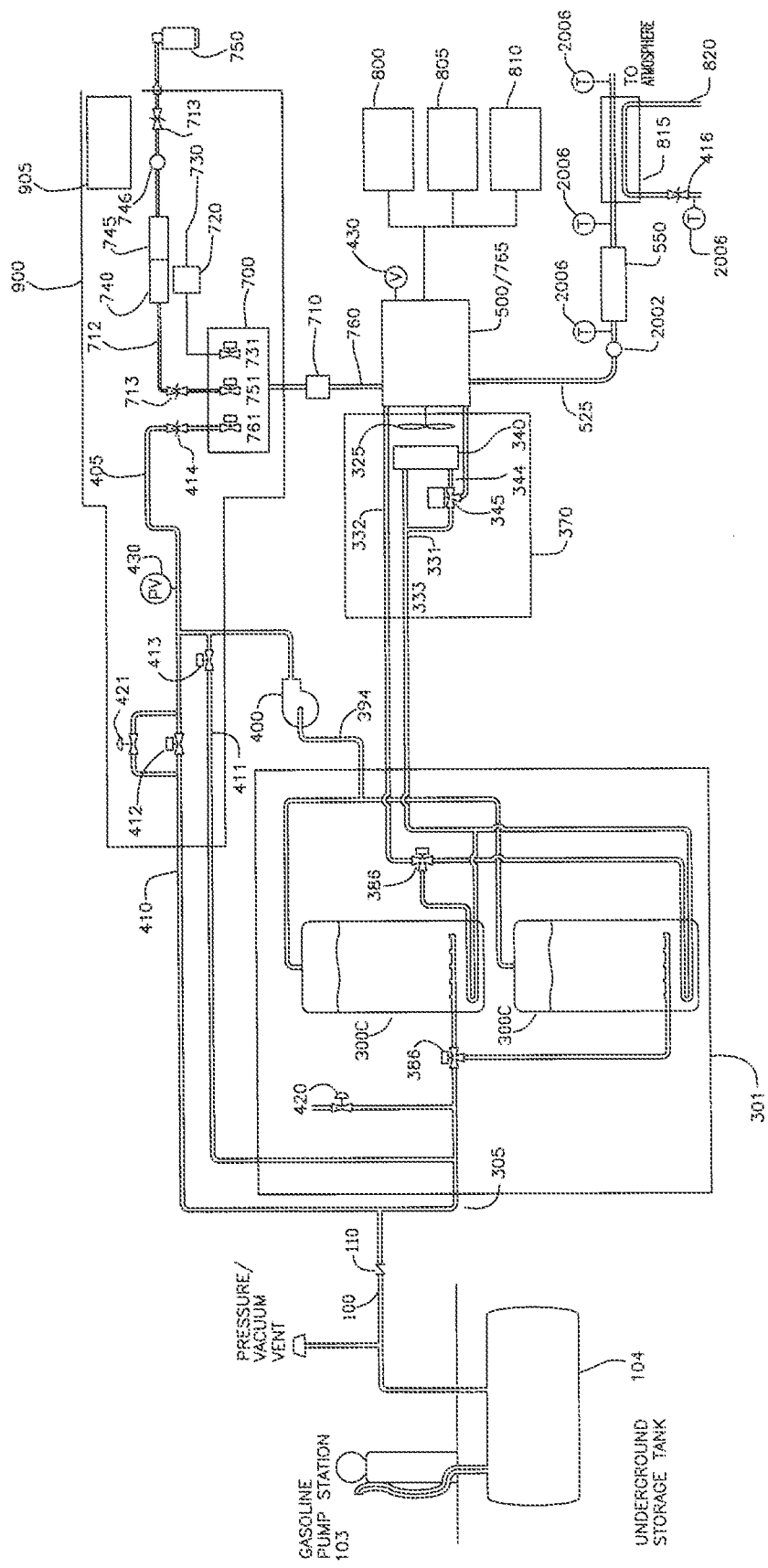

REMEDIAL SYSTEM 10 FOR TREATING VOC'S FROM A VACUUM TANK TRUCK CONCENTRATOR USING ADSORPTION MEDIA

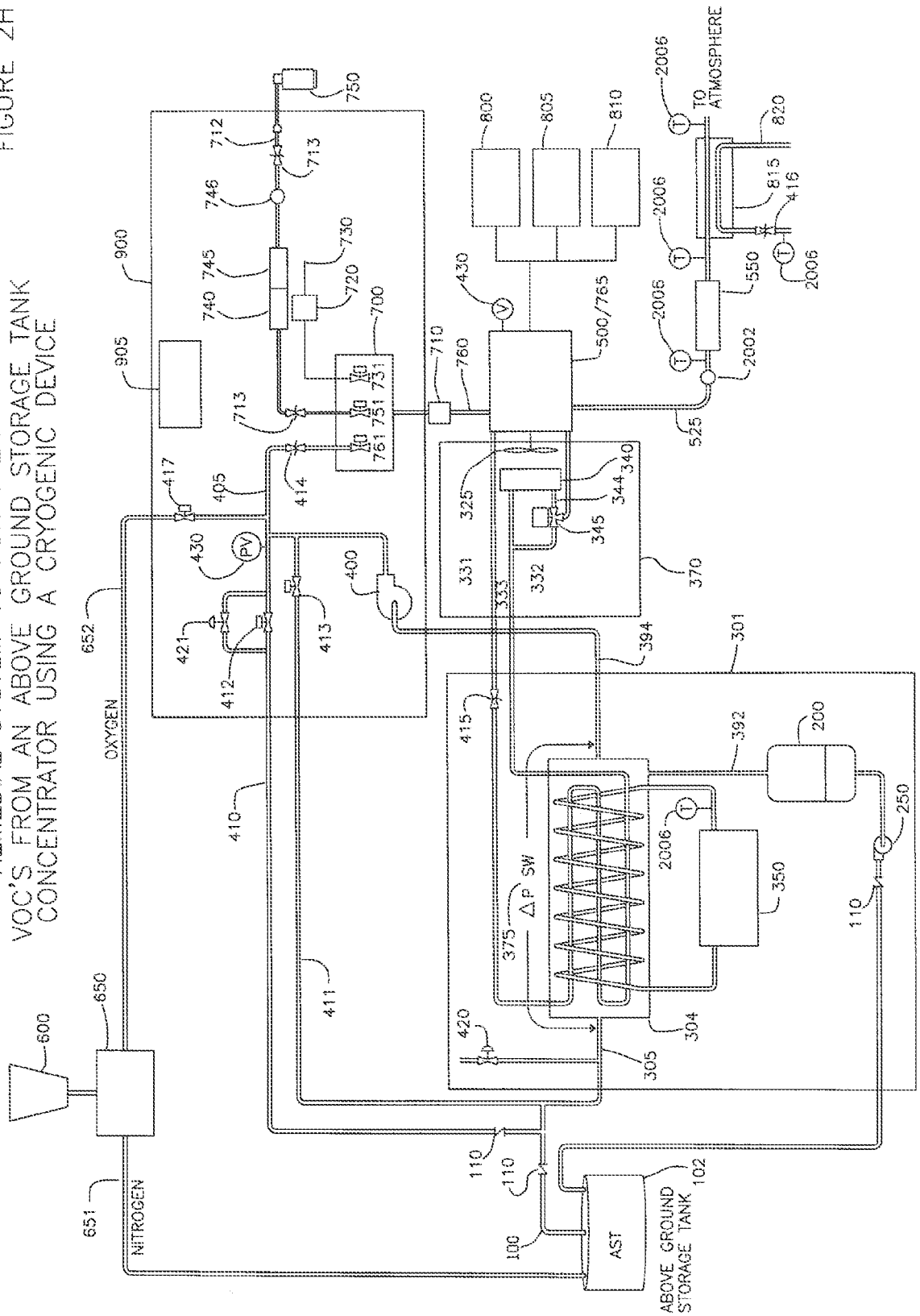

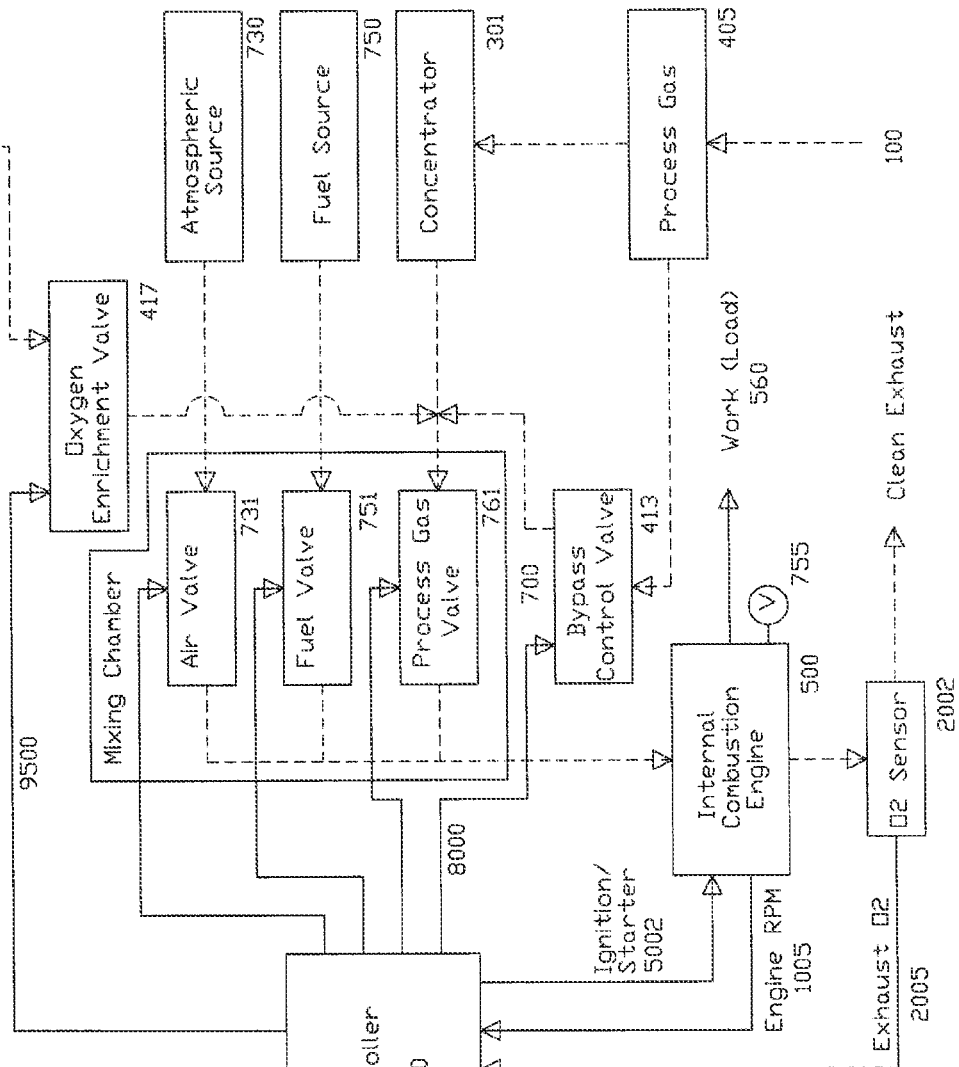

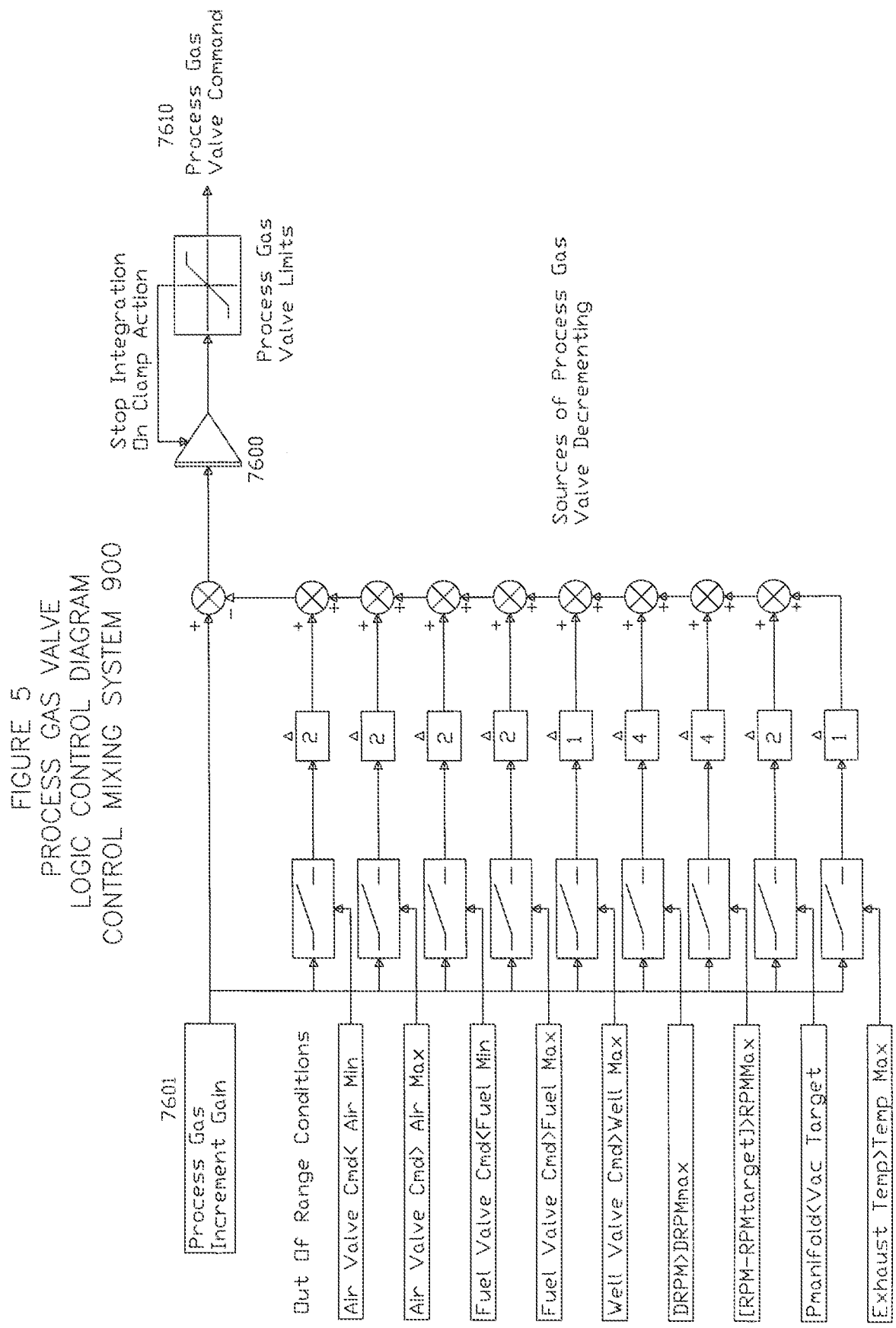

REMEDIAL SYSTEM: A POLLUTION CONTROL DEVICE FOR UTILIZING AND ABATING VOLATILE ORGANIC COMPOUNDS

CROSS-REFERENCE TO RELATED APPLICATION(S)

This application claims priority of U.S. Provisional Patent Application No. 61/054,452, filed May 19, 2008, the entire contents of which is incorporated herein by reference.

BACKGROUND

Vapor streams containing volatile and semi-volatile organic compounds (VOCs and SVOCs) are produced by industrial processes; as a result of the transfer of liquids from one containment body to another due to the displacement of air or liquid, by their volatilization during the industrial process or by contaminated soil remediation or other environmental cleanup operations. These processes typically use either vacuum or pressure pumps, blowers or compressors. Air displaced in the process becomes saturated with vapors containing VOCs and SVOCs that can cause environmental damage or health issues.

Until most recently, control and destruction of these vapors was traditionally done with different pollution control devices that controlled and/or oxidized the vapors. Suitable devices have included open burning flares, thermal oxidizers, catalytic oxidizers and conventional internal combustion engines (ICE). A conventional ICE is one that utilizes a standard carburetor which has one fuel input and one air input. Recently implemented environmental regulations or changes to existing regulations have made the present form of oxidizers either too polluting, unsafe to operate, too expensive or obsolete. Alternatively, VOCs and SVOCs can be removed and controlled by adsorption onto activated carbon, but excessive cost and handling are of concern due to the large volumes of carbon typically required for proper abatement.

Industrial process vapor streams vary in volume/density and BTU content of VOCs and SVOCs which directly impacts the composition of the air fuel mixture going to an oxidation vehicle. While carbon adsorption is not adversely affected by a change in air fuel mixture, safety and control limitations for current oxidation technologies such as flares, thermal/catalytic oxidizers and conventional ICE's can require significant and expensive amounts of alternate fuel source in order to combust the VOCs and SVOCs in the vapor stream. In addition, traditional oxidizers are usually physically large in size and are oversized in order to handle fluctuation of the BTU content of the vapor stream. As a result, traditional oxidizers burn excessive amounts of alternate fuel, and therefore generate significant amount of greenhouse gas emissions without effectively recovering the energy available from the VOCs and SVOCs in the vapor stream.

Similarly, the adsorption of organic compounds onto an activated carbon process bed requires a large footprint storage container. A large volume of charcoal is required in order to process VOCs in a comparable amount of time as that of other oxidizing vehicles. Additionally, once the activated carbon has reached its maximum "spent" loading capacity it has to be replaced by a new container of charcoal. The spent charcoal has to be desorbed to reprocess/recover it for reuse. This reprocessing requires energy (alternate fuel source), generates additional waste streams and produces greenhouse gas emissions. Furthermore, carbon is unsafe for processing high VOC content vapor streams because the carbon may easily ignite.

A conventional ICE attempts to use the volatile vapor stream as the primary fuel source. However, it does not have the capability to handle the rapidly changing air flow volume/density and varying BTU concentrations found in the process vapor stream. As it uses large amounts of an alternate fuel source (typically propane) mixed with the process vapor stream in order to operate correctly, a conventional ICE is inefficient in reduction of the vapor stream of VOCs/SVOCs and generates more secondary pollutants such as NOx and CO when compared to the present invention, which utilizes a unique control/mixing system with multiple fuel/air valves, specialized software and a custom air fuel ratio controller.

SUMMARY OF THE INVENTION

An aspect of an embodiment of the present invention is directed toward a remedial pollution system for concentrating and capturing energy found in the process vapor stream of various industrial processes, oil and gas production fields and any vessel storing hydrocarbons; and for safely using, treating and/or disposing of VOCs and/or SVOCs. Examples of vessels storing hydrocarbons include above ground and underground storage and process tanks, fixed roof and floating roof storage/process tanks, vacuum tanks, pressure tanks, ship and barge storage/process tanks and any vessel that can contain hydrocarbons for storage and/or process purposes. As used hereinafter, the terms "volatile organic compounds," "organic volatiles," "vapor stream," "head gas," "gas waste stream," and "process gas" will be used interchangeably and are intended to cover both VOCs and SVOCs. Similarly, the term "chiller" is used interchangeably with "condenser," "ICE" is used interchangeably with "internal combustion engine" and "combustor," "remedial system" is used interchangeably with "pollution control device" and the term "VOCs" is also meant to include SVOCs. A "direct chiller" is one where refrigerant is circulated directly in the heat exchanger in contact with the process stream. An "indirect chiller" is one where the refrigeration unit chills coolant that is pumped to the heat exchanger that is in contact with the process stream.

In one exemplary embodiment, the pollution control device includes a concentrator for abating and/or reducing the amount of energy contained in the process gas, and an ICE for generating energy from the remaining process gas. Exemplary embodiments of different concentrators include, but are not limited to, condensers, cryogenic devices, scrubbers, carbon or other suitable adsorption/absorption materials and membrane separation devices. In various embodiments, the remedial system further includes an automated control/mixing system with air fuel ratio controller. In other embodiments, the remedial system also includes an electricity generator and/or hydraulic pump and/or other type of mechanical device to harvest and convert the energy produced from the ICE to other forms that can power the equipment of the remedial system. In yet another embodiment of the present invention, the generated power is used to operate a compressor and oxygen-nitrogen separator to inert the process for safety considerations and to inject stripped oxygen downstream in the process. This balanced approach of stripping and reinjecting oxygen not only results in a safer work environment, it requires less alternate fuel energy source as the correct air fuel ratio for combustion is established without the need for large amounts of additional fuel or air.

In one exemplary embodiment, the concentrator is a condenser. In the exemplary embodiment, the remedial system includes an input line connected to the condenser and adapted to receive VOCs from a source or process, a control/mixing system adapted to receive a vapor stream from the condenser, and an ICE. In a further exemplary embodiment, the condenser has a liquid output line and a vapor output line, the control/mixing system is adapted to receive and control air flow from a supply line, flow from an alternate fuel supply line, and to receive and control the vapor output line from the condenser/chiller, wherein the control/mixing system has a mixed fuel outlet line that is connected to an ICE.

In one exemplary embodiment, there is provided a radiator system adapted to heat the process air inside the chiller to increase vapor condensation and also to be used as a defrost cycle for various applications. In another embodiment, there is provided a holding tank connected to the condenser liquid output line for receiving and storing the volatile organic condensate for later reclamation.

In a further exemplary embodiment, the remedial system may include a vacuum pump having a pump output line. The vacuum pump is connected to the vapor output line of the VOC source or industrial process. There is provided a recycle line that connects the pump output line to the condenser input line. A compressor may also be provided. The compressor includes an input line, connected to a VOC source or industrial process, and a VOC output line which is used to power an oxygen-nitrogen separator and/or to pressurize and recapture VOCs from the process for reclamation.

In another exemplary embodiment, the remedial system includes a catalytic converter connected to the internal combustion engine. In yet another exemplary embodiment there is provided an engine driven pump, a generator and/or a hydraulic pump to convert energy produced by the internal combustion engine into mechanical power, electricity and/or hydraulic power.

In one embodiment, the remedial system is hooked up to a waste process gas stream that would otherwise be vented to a flare. This embodiment may not require a condenser/chiller but still may utilize a generator and/or hydraulic power to operate a compressor or the remedial system will direct drive a compressor, in order to compress and re-inject the waste gas stream back into a process line for reuse.

Another aspect of an embodiment of the present invention is directed toward a remedial method for utilizing VOCs that includes collecting a process stream laden with VOCs, chilling and condensing the VOCs in a plurality of stages to produce a liquid condensate, which is routed to a holding tank and a vapor feed stream, which is routed to an ICE. An air supply stream and an alternate fuel stream are provided and mixed with the vapor feed stream to produce a mixed fuel stream. The mixed fuel stream is maintained at or near a stoichiometric air fuel ratio using a specially designed control/mixing system which blends fuels from two or more varying sources, with atmospheric air from multiple sources based on various control feed back loops. The mixed fuel stream is then drawn into the engine intake manifold using an engine manifold vacuum that may have a turbo charger, to create a near ideal stoichiometric combustible gas stream. The combustible gas stream is consumed by an ICE to generate mechanical power. The mechanical power is then converted to other forms of energy. For example, a generator can be used to generate electric energy or a hydraulic pump can be used to generate hydraulic energy. Alternatively, other mechanical devices can also be used to produce and direct energy to the chiller and/or to other types of concentrator.

In one exemplary embodiment, where the input process gas stream is one that would otherwise go to a flare for oxidation, the process gas stream laden with VOCs is compressed and fed back to a process line for storage or industrial use. In another exemplary embodiment, a portion or all of the process gas stream is recycled back to the condenser.

In a further exemplary embodiment, the remedial system includes providing nitrogen gas to a process gas stream that is laden with VOCs and/or to a designated volatile source such as a wastewater treatment tank, for example. In this way, the oxygen content in the process gas stream or tank is suppressed by displacement of the oxygen with nitrogen for safety reasons and/or to meet a lower explosion limit (LEL) requirement. In one embodiment, the nitrogen gas is obtained from an oxygen-nitrogen gas separator powered by the ICE. In further embodiments, oxygen and remaining atmospheric air obtained from the oxygen-nitrogen gas separator are fed back into the process gas stream that is downstream of the designated volatile source. Oxygen is added back into the process gas stream to enable oxidization. In this way, only minimal alternate fuel and/or oxygen are needed at the control/mixing system to provide a combustible fuel supply to the ICE.

In another exemplary embodiment, the pollution control device is hooked up to a fume line that captures displaced gasoline vapors from vehicles and/or underground storage tanks when the vehicles or underground storage tanks are being refueled. The fume line from the gasoline dispenser is routed back to an underground storage gas tank, which is connected to the remedial system of the present invention. Fumes can thus be abated on site, or processed to produce a VOC condensate that can be reused as a fuel source to run the remedial system or other equipment on site, or to produce energy that can be put back into the energy grid.

Other aspects and features of the remedial device provided herein may be better appreciated as the same become better understood with reference to the specification, claims, and appended drawings.

BRIEF DESCRIPTION OF THE DRAWINGS

The accompanying diagrams, together with the specification, illustrate exemplary embodiments of the present invention and together with the description, serve to explain the principles of the present invention. In the following drawings, only certain pollution sources are shown by way of illustration. As those skilled in the art will recognize, the pollution sources may be embodied in many different forms and should not be construed as being limited to the drawings set forth herein.

FIG. 1 is a block diagram of a pollution control device for treating volatile organic compounds according to embodiments of the present invention. An air pollution source is routed to a concentrator and/or proportionally bypassed to the control mixing system of the combustor.

Vapors are destroyed in an ICE and the power generated from the ICE powers the remedial process.

Figure 2B:
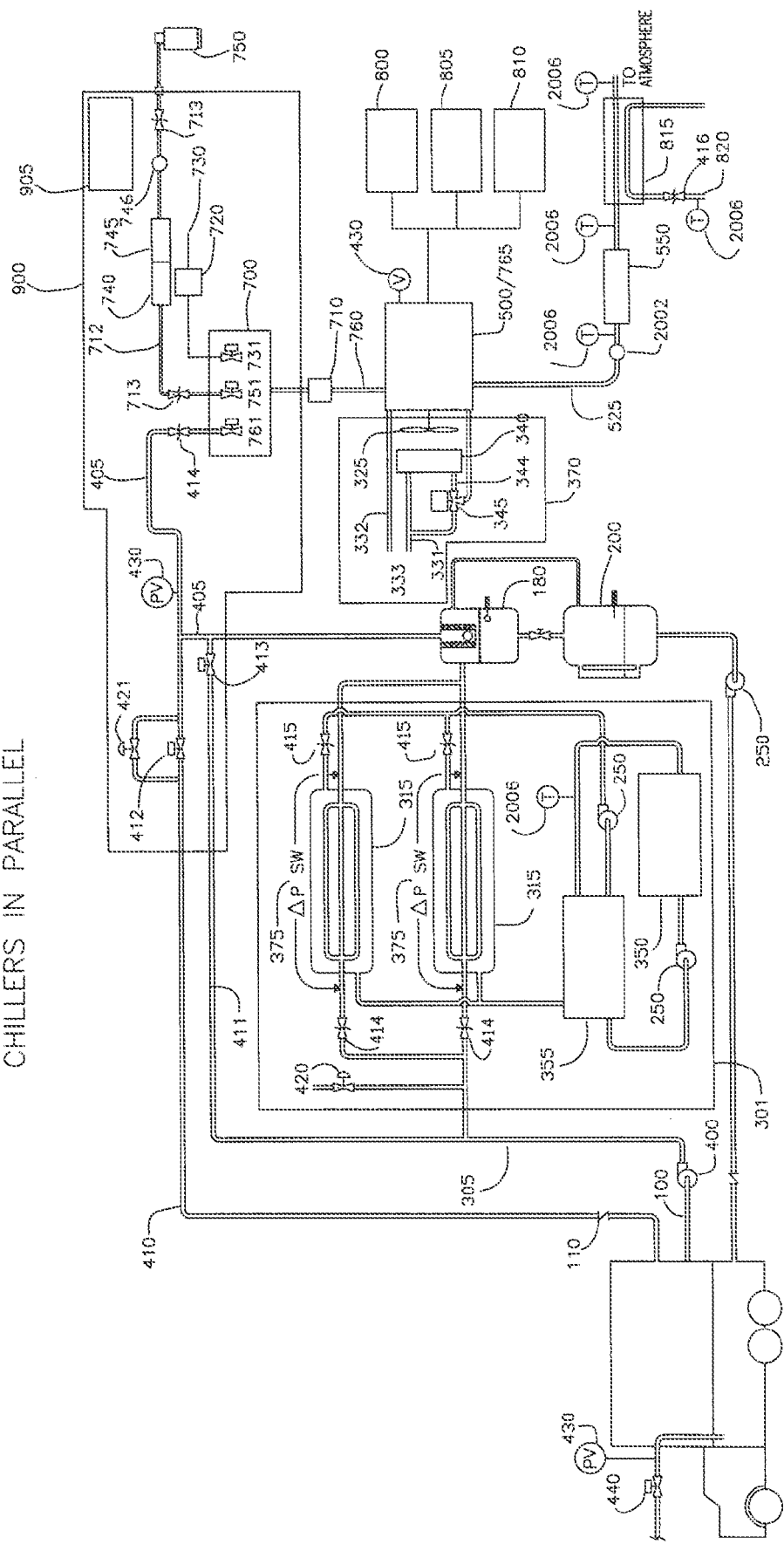
FIG. 2B is a process diagram of a remedial system for treating and/or capturing volatile organic compounds from a vacuum tank truck using a concentrator that utilizes an indirect chiller with two units in parallel. VOCs are introduced to the control/mixing system to be processed for combustion.
Figure 2C:
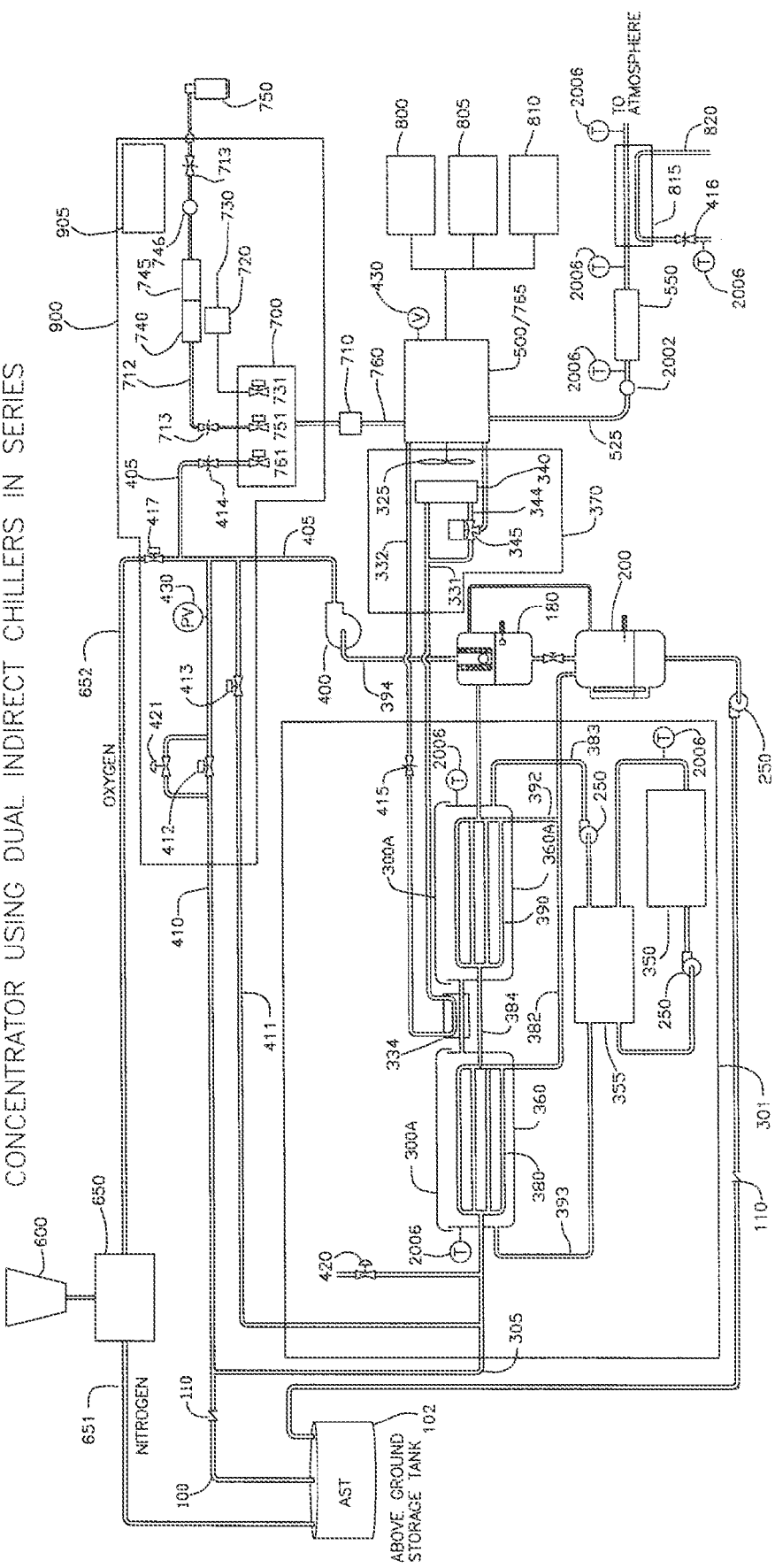
FIG. 2A is a process diagram of a remedial system for treating and/or capturing volatile organic compounds from an oil and/or natural gas well or production field using a concentrator that utilizes a direct chiller. VOCs are introduced to the control/mixing system to be processed for combustion. Vapors are destroyed in an ICE and the power generated from the ICE powers the remedial process.

FIG. 2C is a process diagram of a remedial system for treating volatile organic compounds from an above ground storage tank using a concentrator that utilizes an indirect chiller with dual units in series. In this embodiment, a compressor also feeds atmospheric air into an oxygen-nitrogen separator whereas nitrogen is used to inert a storage tank and the stripped oxygen is introduced to the control/mixing system to be processed with the VOCs for combustion. Vapors are destroyed in an ICE and the power generated from the ICE powers the remedial process.

FIG. 2D is a process diagram of a remedial system for treating volatile organic compounds according to another embodiment of the present invention. In this embodiment, the designated volatile source is an active gasoline service station with VOCs recovered from both the dispenser(s) and an underground storage tank. The concentrator in this embodiment uses a single indirect chiller. VOCs are introduced to the control/mixing system to be processed for combustion. Vapors are destroyed in an ICE and the power generated from the ICE powers the remedial process.

Figure 2E:
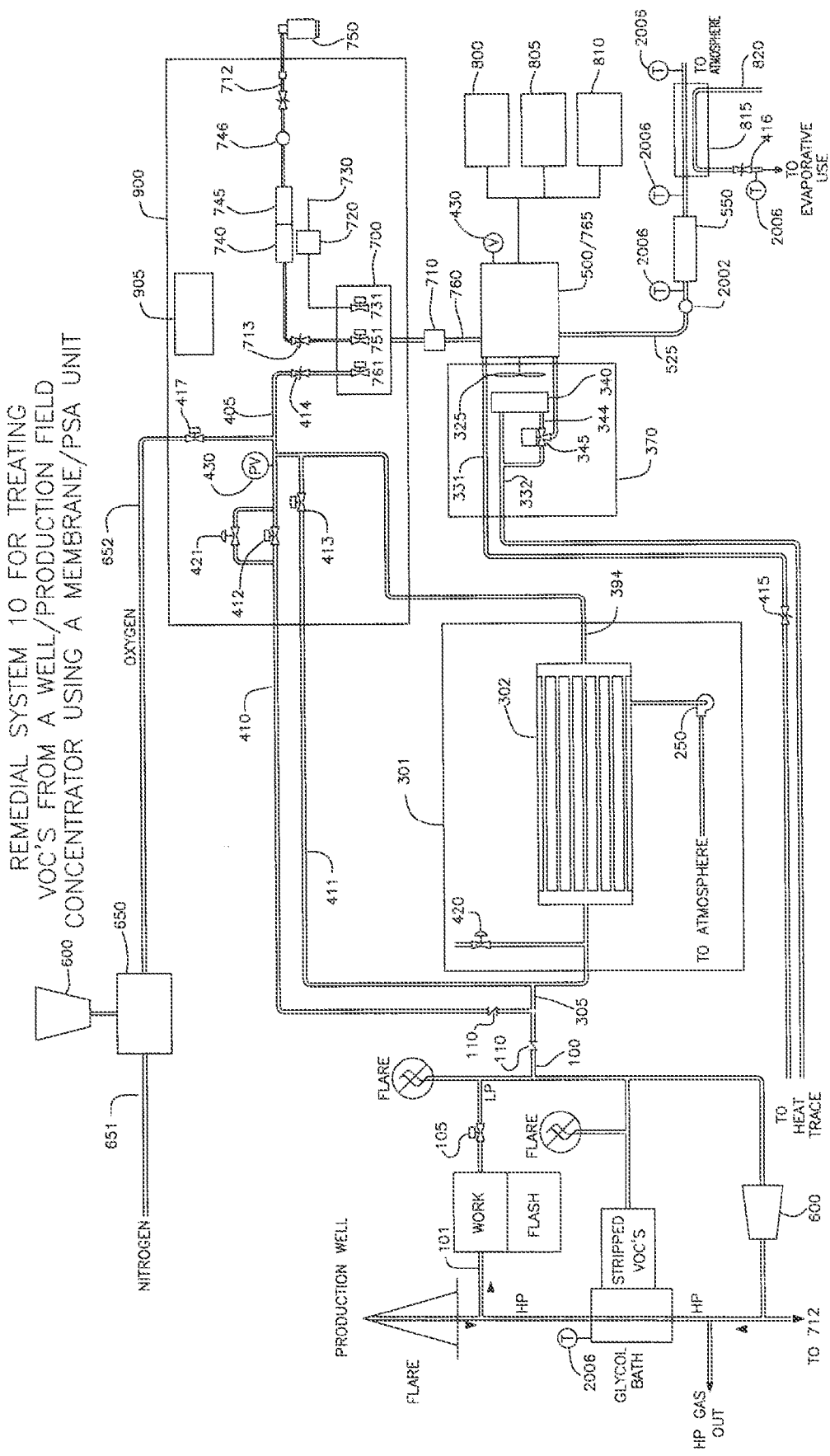

FIG. 2E is a process diagram of a remedial system for treating and/or capturing volatile organic compounds from an oil and/or natural gas well or production field using a concentrator that utilizes a membrane/pressure swing absorption separation device. VOCs are introduced to the control/mixing system to be processed for combustion. Vapors are destroyed in an ICE and the power generated from the ICE powers the remedial process.

FIG. 2F is a process diagram of a remedial system for treating and/or capturing volatile organic compounds from a gasoline service station with VOCs recovered from both the dispenser(s) and an underground storage tank using a concentrator that utilizes a scrubber device. VOCs are introduced to the control/mixing system to be processed for combustion. Vapors are destroyed in an ICE and the power generated from the ICE powers the remedial process.

Figure 2G:
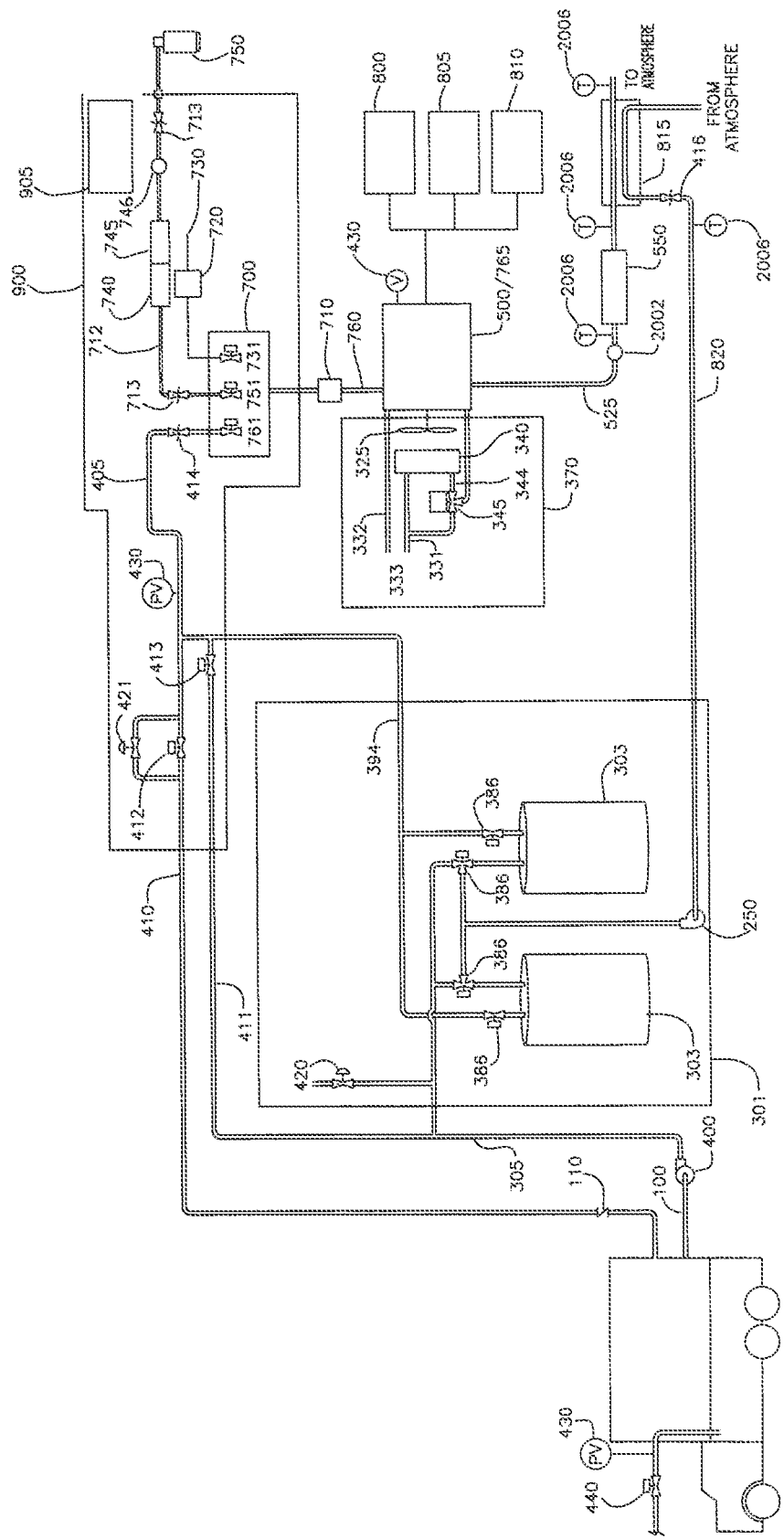

FIG. 2G is a process diagram of a remedial system for treating and/or capturing volatile organic compounds from a vacuum tank truck using a concentrator that utilizes an adsorption device. VOCs are introduced to the control/mixing system to be processed for combustion. Vapors are destroyed in an ICE and the power generated from the ICE powers the remedial process.

FIG. 2H is a process diagram of a remedial system for treating and/or capturing volatile organic compounds from an above ground storage tank using a concentrator that utilizes a cryogenic device. VOCs are introduced to the control/mixing system to be processed for combustion. Vapors are destroyed in an ICE and the power generated from the ICE powers the remedial process.

FIG. 3 is a block diagram of a control/mixing system according to an embodiment of the present invention.

Figure 4:
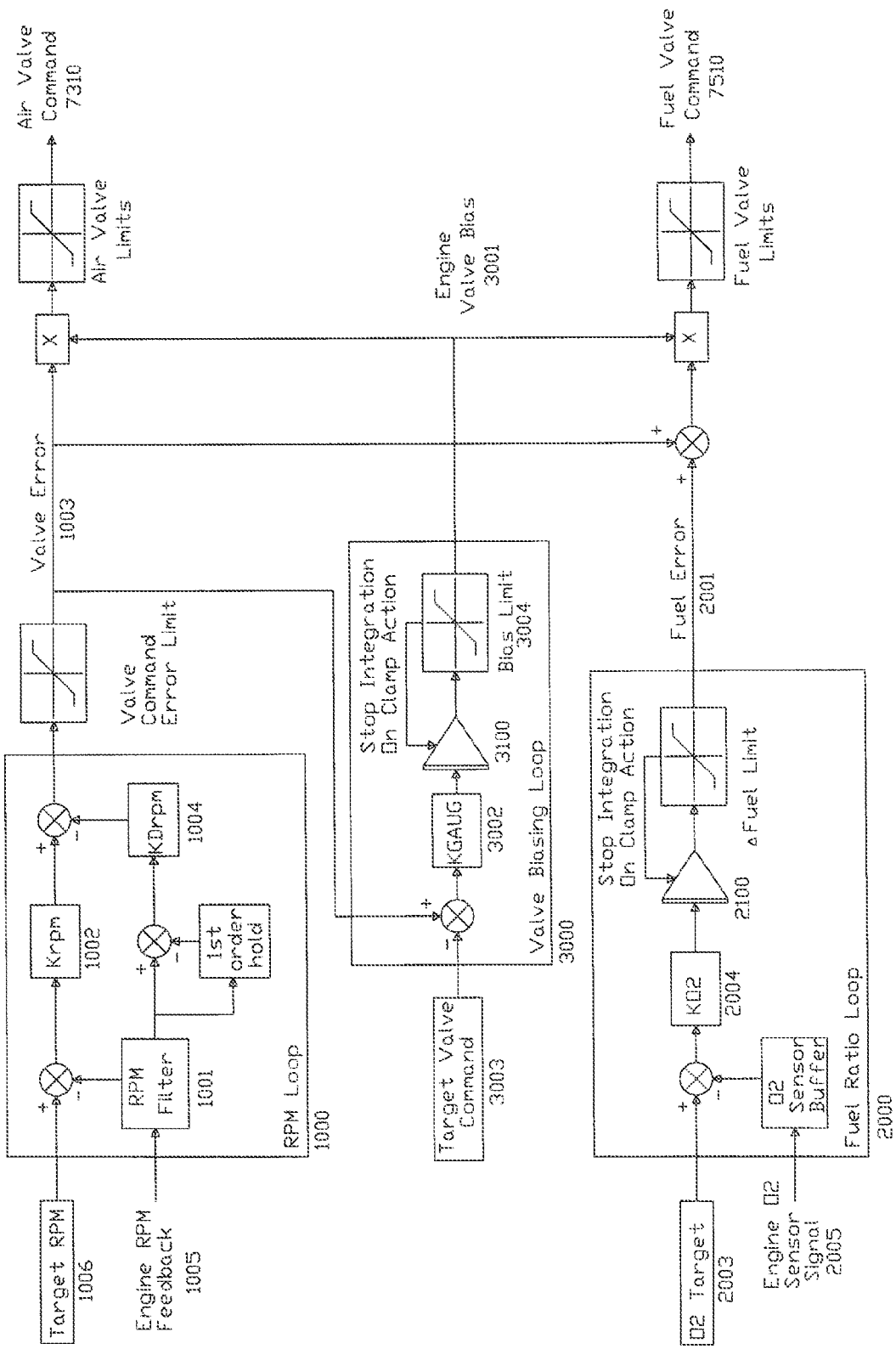

FIG. 4 is a logic control diagram of an air fuel controller according to an embodiment of the present invention.

FIG. 5 is a logic control diagram illustrating control logic of a process gas valve according to an embodiment of the present invention.

DETAILED DESCRIPTION OF THE INVENTION

In the following detailed description, only certain exemplary embodiments of the present invention are shown and described, by way of illustration. Like numbers are used to designate like components or features. An index of the drawing numbers and related components or features is attached as Appendix A. As those skilled in the art would recognize, the invention may be embodied in many different forms and should not be construed as being limited to the embodiments set forth herein.

In accordance with some embodiments of the invention, the remedial system includes one or more type of concentrators, mixing control system and an ICE. The concentrator is used to abate some of the process gas collected from a VOC laden source, and to provide reduced energy content of an organic volatile source so that it can be consumed by the ICE without restricting flow. By use of the specially constructed control/mixing system, the ICE uses the VOCs in the process gas as a fuel to generate energy, which can be harvested and converted to other useable forms of energy. When more than the minimal alternate fuel is necessary to run the ICE, a portion of volatile source is routed direct to the mixing/control system to reduce alternate fuel usage.

In certain embodiments, the VOC laden source can produce extreme variable flows and/or fuel energy values. In one embodiment, the VOC laden source is a storage tank capable of producing a process gas stream with a fuel value or energy density between 10 BTU/ft$^3$ upwards to 3000 BTU/ft$^3$ in a period of minutes, if not seconds. Such process gas streams with high energy content fluctuations can only be oxidized by having large or multiple flares, multiple ICEs, or multiple combinations of other type oxidizers since a typical flare, or ICE or direct fired oxidizer only has an energy consumption capacity of approximately 105 BTU/ft3 steady state. Indirect fired thermal oxidizers have an energy consumption capacity range between 15 BTU/ft3 and 30 BTU/ft3, in steady state condition. Alternatively, with the present invention, a variable and unsteady process gas stream with changing BTU content is managed with a specialized control/mixing system, which will be further discussed below, combined with a VOC pretreatment method which passes the highly variable process gas stream through a concentrator to reduce the energy mass per cubic foot to a more suitable and usable condition.

Accordingly, in certain embodiments of the present invention, the remedial system includes a concentrator adapted to reduce the organic volatiles of a process gas stream so that a reduced consistent energy content, and/or constant amount of fuel can be supplied to the ICE. According to yet another embodiment, the remedial system further employs a control/mixing system with a variable air fuel controller, multiple process control valves and a mixing chamber to regulate extreme fluctuations in energy density and/or flow of the process gas stream so that a constant air/fuel mixture is fed to the ICE.

Suitable process equipment that can be used as a concentrator include condensers, cryogenic devices, scrubbers, carbon or other suitable adsorption/absorption material devices, and pressure swing absorption/membrane separation devices. The following description of the present invention will be made with a remedial system utilizing a condenser/chiller. However, it is to be understood that other equipment such as the ones mentioned above and other concentrating or separation methods can also be used to reduce volatiles from a VOC laden source, and such embodiments when used with the ICE are within the scope of the present invention.

According to one exemplary embodiment of the present invention, the VOC remedial system includes an input manifold for collecting VOCs from a designated volatile source, a condenser for condensing some of the volatiles into a liquid stream for recovery and a control/mixing system for receiving the remaining vapor stream and mixing it with air and an alternate fuel (i.e. propane) to form a fuel mixture feed for an ICE. The fuel mixture feed is kept at or near a stoichiometric air to fuel ratio using an automated air fuel controller that blends fuels and oxygen from multiple sources based on multiple control feedback loops. In the remedial system of the exemplary embodiment, the ICE is also used for generating electricity and/or hydraulic energy or other types of mechanical energy as needed. The generated energy can be used to power the condenser, compressors needed by the remedial system, or for other process needs.

In an exemplary embodiment, the ICE initially operates on an alternate fuel source, such as propane, to drive the ICE. As adequate VOCs and SVOCs contained in a VOC laden source are conditioned and mixed with air and alternate fuel to fuel the ICE, the alternate fuel and air source are cut back practically to nil, other than small amounts of air and fuel that are purposely dithered in to maintain a proper air and fuel mixture at or near a stoichiometric air to fuel ratio. The air fuel controller of the control/mixing system blends fuel from the laden VOC source and the alternate fuel source with atmospheric air based on oxygen content, revolutions per minute (RPM), valve biasing, alternate fuel demand/process gas bypass flow, temperature, and pressure control feedback loops.

The power produced by the ICE is then converted into electricity by a power generator or into hydraulic pressure by a hydraulic module. The produced electricity or pressure is then used to drive a condenser and/or a compressor located upstream of the ICE to start a continuous loop of generating a liquid organic condensate for reclamation, feeding residual VOCs to the ICE for oxidation, and optionally, in certain embodiments, compressing the VOCs back to a recovery process line. The recovered VOCs can be reused in the industrial process, rerouted back for oxidizing in the ICE, or disposed of by other methods.

According to an exemplary embodiment of the present invention, about 80 to 90% of the VOCs obtained from the laden VOC source are compressed and flow back to the process pipeline for distribution or sale. In further embodiments, the 10 to 20% balance of the VOCs is used as a primary energy source for the ICE hence eliminating the need of the alternate fuel source. The VOC percentages recovered vary dependent upon the density of VOCs in the actual process gas flow from the VOC laden source.

According to another exemplary embodiment of the present invention, about 99.9% of the VOCs obtained from the laden VOC source are removed by means of condensing and oxidizing the volatiles using a condenser and an ICE that run in series or parallel and/or combination thereof.

Secondary pollutants such as carbon monoxide (CO) and nitric oxide (NOx) are byproducts of incomplete combustion of all oxidizers. For the present invention, these secondary pollutants are controlled by use of an automotive catalytic converter. For the automotive catalytic converter to function properly, the air fuel ratio must be controlled using a specialized control/mixing system with its automated air fuel controller. The present invention is able to control the air fuel mixture to a point that is within the extremely small lambda window of the engine exhaust oxygen sensor, even with the constantly changing air fuel ratio caused by multiple fuel and air inputs from the varying process vapor stream.

In yet another exemplary embodiment of the present invention, even a higher percentage of VOCs obtained from the laden VOC source are removed by means of concentrating, condensing, compressing and oxidizing the volatiles. In the exemplary embodiment, a high amount of VOCs is removed or recycled resulting in a reduction in the emission of toxic air pollutants as well as greenhouse gases, particularly carbon dioxide and methane, due to a reduction of overall combustion required.

In another exemplary embodiment of the present invention, an alternate fuel source such as propane is used initially to provide fuel to the ICE and warm it up to a steady state condition. Once the ICE has reached steady state, the alternate fuel source is reduced as an increased volume of VOCs obtained from the volatile laden source are introduced. This process gas stream of VOCs is typically sufficient to power the ICE. Accordingly, the remedial system of the exemplary embodiment produces less greenhouse gas emissions as compared to other oxidizing technologies due to the fact that the BTU value of the vapor stream is purposely used in lieu of the alternate fuel source to run the ICE oxidizer. Other oxidizing vehicles require a constant alternate fuel source resulting in more energy consumed (hence more greenhouse gas emissions) to oxidize and destroy the energy found in the vapor stream.

With reference now to FIG. 2A, a process diagram of an exemplary embodiment of the present invention is shown. The intake vacuum 765 of ICE 500 is used to extract a fuel supply managed by control mixing system 900 and air fuel controller 905, which will be described in detail further below, to produce power. In an exemplary embodiment, the power generated from ICE 500 is used to drive a generator 800 and/or a hydraulic pump 810 to convert the power into electric and/or hydraulic energy, respectively, or to run a mechanical device 805 directly off the ICE 500.

In one exemplary embodiment, the produced energy is used to power a condenser unit 300 and optionally, a vacuum pump 400. The ICE 500 intake vacuum 765 and/or the optional vacuum pump 400 draws a stream of VOCs and SVOCs contained in condenser unit 300 and direct it to control mixing system 900 to be mixed as a fuel. As the ICE 500 intake vacuum 765 and/or the optional vacuum pump 400 operate, volatile components are aspirated from a designated volatile source 100. When the optional vacuum pump 400 is present, the vacuum pump supplements the vacuum 765 of the ICE 500.

The condenser unit 300 condenses a controlled portion of the VOCs and turns them to a liquid condensate. The liquid condensate is drained or pumped out of condenser unit 300 to holding tank 200 and the remaining volatiles are fed to control mixing system 900 using the intake vacuum 765 of ICE 500 and/or the optional vacuum pump 400. A recirculation line 410 containing a process control valve 412 is shown. If the vacuum pump 400 delivers more VOCs or flow than the ICE 500 is able to process, the excess VOCs or flow are directed back into condenser unit 300 via recirculation line 410. In the event the ICE 500 begins to use more than the minimal alternate fuel 750 necessary for control, a portion of volatile source 100 is routed past condenser 300 via bypass control line 411 and bypass valve 413 direct to the mixing/control system 900 to reduce alternate fuel usage.

In one exemplary embodiment, a process compressor 600 is provided. The process compressor 600 is capable of compressing the low pressure organic volatiles so that the volatiles can be re-injected into a high pressure gas stream. In this way, the volatiles can reenter the process line for industrial use or be stored in a storage tank for later distribution or sale. In one embodiment, process compressor 600 receives the VOCs stream from the designated volatile source 100. In another embodiment, compressor 600 receives atmospheric air and delivers compressed air to an oxygen-nitrogen separator 650, where nitrogen generated is used to inert the process and stripped oxygen is used to maintain combustion in ICE 500.

In the exemplary embodiment shown, the designated volatile source 100 may be VOCs from a production well, glycol bath vapors or flares that are "turned off" by use of the invention. The designated volatile source can also be other sources; such as a vacuum tank truck, a gas station underground storage tank/dispenser, a wastewater treatment tank, above ground storage tanks, railcars, barges, VOCs from contaminated soil remediation (SVE soil vapor extraction) and any other source of controlled or uncontrolled VOCs, all of which are applicable sources for energy to operate the invention.

In the exemplary embodiment shown in FIG. 2B, a vacuum tank truck stores the organic fluid extracted from a pollution source such as a well, an industrial storage tank, or a contaminated soil area. As the tank truck is filled up with the organic fluid, volatile components such as VOCs and SVOCs are displaced. The VOCs from vapor source 100 are then evacuated by the ICE 500 intake vacuum 765 or optionally enhanced by the vacuum pump 400. The vacuum source is used to pull liquids into the vacuum tank which causes the displacement of tank VOCs through a condenser input line 305 to concentrator 301. In the exemplary embodiment, a check valve 110 is provided in the vapor source line 100 so that the VOCs will not flow back to the source. Concentrator 301 includes two indirect chillers 315 run in parallel. Each chiller 315 uses a heat exchanger surrounded by a coolant to condense VOCs to greater density in the process gas stream. The coolant is chilled and circulated through each chiller by means of refrigeration unit 350, coolant holding tank 355 and pumps 250. Control of the process gas and refrigerant flows is managed by control mixing system 900 which utilizes differential pressure switches 375 to monitor the pressure of the process gas on either side of chillers 315. The pressure feedback loop of control mixing system 900 allows the system to open and close process flow valves 414 and coolant flow valves 415 so as to maintain a constant flow of VOCs to the ICE 500. As the process gas stream leaves concentrator 301, it first passes through liquid vapor separator 180, which removes/drops out VOC condensates which are passed on in to holding tank 200 for collection and return to the vacuum tank truck. In this embodiment, a pressure relief valve 420 is also provided within concentrator 301 for an emergency safety relief to atmosphere in the unlikely event of a simultaneous failure in the shut position of all process gas valves in the concentrator. Another pressure relieve valve 421, set at a lower pressure setting than pressure relief valve 420, vents back into the process line so that a small pressure build up will not cause a release to atmosphere but will allow control system 900 ample time to adjust recirculation valve 412 to compensate for the changing conditions.

In one exemplary embodiment, as shown in FIG. 2A, concentrator 301 uses a direct chiller; condenser unit 300. Condenser unit 300 is a multi-staged condenser having multiple sets of cooling coils 310. The VOCs from a vapor source 100 are drawn to cooling coils 310 by the ICE 500 intake vacuum 765 and/or enhanced by the optional vacuum pump 400 to partially condense the VOCs into a liquid condensate. The vapor stream may be circulated within condenser 300 at a high flow rate using a fan 320 to increase the number of passes over the cooling coils 310 to aid in the condensing process. In one embodiment, fan 320 increases the flow rate of the vapor stream inside condenser unit 300 by ten times. The liquid condensate exits condenser unit 300 through a condensate line 392 to holding tank 200. The VOCs continuously get recycled through condenser unit 300 by fan 320 and go through cooling coils 310 until more condensate is obtained. The remaining uncondensed VOCs are then transferred on via condenser output line 394 and pump 400 to be eventually consumed as energy/fuel by ICE 500.

In an exemplary embodiment, condenser unit 300 has multiple sets of cooling coils 310. Each set of cooling coils 310 contains a refrigerant to provide cooling. The cool refrigerant gas is compressed by a compressor 350, causing it to become a hot and high pressure refrigerant gas. The hot refrigerant gas runs through a set of coils so it can dissipate its heat and condense back into a refrigerant liquid. The refrigerant liquid then runs through an expansion valve causing it to become a cold gas which goes through a set of cooling coils 310. The cold gas contained in cooling coils 310 absorbs heat from the VOCs and condenses the volatiles into a liquid state.

The condenser unit 300 of the exemplary embodiment of FIG. 2A includes both a gas refrigerant system that has a plurality of cooling coils 310, as previously described, and a radiator system 370. The radiator system 370 is provided to cool down ICE 500. At the same time, it is used to heat up the VOCs in condenser unit 300 if necessary. Radiator system 370 includes coolant that is stored in a heat exchanger 330, a cooling coil 340, a coolant input line 331, a coolant output line 332 and a cooling fan 325.

In one exemplary embodiment, coolant from the radiator system runs via line 331 to ICE 500 to cool down the engine. The heated coolant then exits the ICE 500 via output line 332 and is routed back to heat exchanger 330, which is used to heat the volatiles so that they may be condensed again. In the exemplary embodiment, heat exchanger 330 is located inside condenser unit 300 so that the coolant in heat exchanger 330 can be cooled down by the volatiles in condenser unit 300. The VOCs are circulated through the condenser using fan 320. As the coolant radiates heat through the heat exchanger 330 the temperature of the volatiles increases. As the cooled coolant exits heat exchanger 330 via input line 331 it is routed, if needed, to a cooling coil 340 for further cooling. The cooled coolant flows to a temperature control valve 345 that either redirects the coolant back to cooling coil 340 for further cooling or to ICE 500 to cool down the engine if the temperature of the coolant is low enough. It is anticipated that the coolant may also be used for a defrost cycle in this and other types of condensers/chillers that might be used.

In one exemplary embodiment, cooling coil 340 has a sufficiently large surface area so that the coolant contained inside can be air cooled. In another embodiment, a fan 325 may be used to further cool the coolant before it enters the ICE 500.

Initially, when remedial system 10 operates, the ICE 500 is relatively cool and hence most of the coolant that exits the heat exchanger 330 via input line 331 goes directly to the ICE 500 bypassing the cooling coil 340. However, as operation of remedial system 10 continues, the ICE 500 heats up thereby increasing the temperature of the coolant in the output line 332. The heated coolant is then routed to heat exchanger 330 and cooling coil 340 before returning back to the ICE 500. Some of the coolant may have to go through a bypass line 344 to the cooling coil 340 a plurality of times if the temperature of the coolant after exiting heat exchanger 330 is not sufficiently cool enough.

Similar to cooling coil 340, heat exchanger 330 is a coiled pipe type of exchanger that has a large surface area. In this way, more heated surface area is exposed to the VOCs in the condenser unit 300, thereby heating them and preventing moisture in the volatiles from being frozen. Further, in such a configuration, collection of the VOCs and SVOCs condensate is easier.

The VOCs condensate is collected at the bottom of condenser unit 300 and is eventually discharged through condensate line 392. The remaining VOCs exit through condenser output line 394 and travel to an optional vacuum pump 400 as dehumidified process gas. The ICE 500 and/or the optional vacuum pump 400 draws a stream of process gas from the condenser output line 394 and feeds it to a control mixing system 900. In one embodiment, the optional vacuum pump 400 is provided to enhance the process by putting the volatile source 100 under vacuum quicker rather than relying on the vacuum 765 created by the ICE 500 alone. Recirculation line 410 and recirculation valve 412 are provided to ensure any excess flow of the vapor is recirculated back to the condenser unit 300 and thus prevents flooding of the ICE 500 with excess fuel. A bypass line 411 and bypass valve 413 are also provided to route a portion of process gas 100 around the condenser unit 300 if needed to reduce alternate fuel consumption as controlled by the control mixing system 900.

With reference now to FIG. 2C, another exemplary embodiment of a concentrator unit is shown. In one embodiment, the concentrator includes a glycol condenser unit 300A that has at least one glycol bath tank. In an exemplary embodiment, the glycol condenser unit 300A has two glycol bath tanks 360 and 360A. In the present embodiment, a VOCs stream obtained from a designated volatile 100 source, an above ground storage tank for example, is extracted through a condenser input line 305 and then routed to a first heat exchanger 380.

In an exemplary embodiment, the first heat exchanger 380 is submerged in a glycol bath 360 that has a cooled bath temperature. In one embodiment, the bath temperature ranges from about 34 to about 40° F. The first heat exchanger 380 cools and condenses moisture from the VOCs stream to render a dehumidified VOCs stream. The moisture condensate is drained through a moisture condensate output line 382 to holding tank 200 and the dehumidified VOCs stream is then fed to a second heat exchanger 390 through a dehumidified vapor line 384.

The second heat exchanger 390 is submerged in the second glycol bath tank 360A that has a super cooled bath temperature. In one embodiment, the bath temperature ranges from about 14 to −25° F. The super cooled glycol bath condenses the dehumidified VOCs stream into a VOC condensate. The VOC condensate drains through a VOC condensate line 392, which is then routed to holding tank 200 for storage. Alternatively, the VOC condensate can be routed to a process line for industrial use. The remaining VOCs are then extracted through a condenser output line 394 using the intake vacuum of the ICE 500 and/or the vacuum pump 400 and routed to a liquid vapor separator 180 where any liquid condensate is removed and fed to holding tank 200. Downstream of liquid vapor separator 180, VOCs are routed to control mixing system 900 via process gas line 405. The proper amounts of air, alternate fuel and VOCs are then mixed by control mixing system 900 and fed to ICE 500 as a combustible fuel stream for oxidation and energy generation.

In one embodiment, a VOC bypass line 411 is provided. VOC bypass line 411 connects the condenser input line 305 to the condenser output line 394 allowing the VOCs stream to bypass a concentrator 301. VOC bypass line 411 provides VOCs to fuel the ICE 500 in the event pre-condensing is not required. In addition, bypass line 411 provides some flexibility to control the amount of organic volatiles and/or flow rate that are routed to the ICE 500 to compensate for fluctuations in process operations and/or different load demands put on the ICE 500 from loads of the electricity generator 800, and/or hydraulic pump 810 or other equipment driven by the ICE 500. Furthermore, fuel usage feedback loop 8000 (line 411 with control valve 413) as controlled by control mixing system 900 ensures that the ICE 500 uses BTU value from process gas first instead of using alternate fuel source.

In one exemplary embodiment, the first heat exchanger 380 is designed to handle a VOCs stream having a flow rate range of about 50 to 250 SCFM, and to yield a dehumidified VOCs stream with less than 5% relative humidity.

In this exemplary embodiment, the glycol condenser unit 300A includes two heat exchangers 380 and 390. In other embodiments, only one heat exchanger and one glycol bath are needed to manage the VOCs stream being processed. In yet another embodiment as shown in FIG. 2D, the concentrator unit is a single or multiple (in parallel or series) shell and tube heat exchanger 300B with glycol pumped through one side of the heat exchanger 300B and the volatile stream pulled through the other.

In yet another embodiment as shown in FIG. 2F, the concentrator unit utilizes dual scrubbers 300C run in parallel. In this embodiment, VOCs in the process steam are run in parallel through line 305 to scrubbers 300C where a portion of VOC gases in the process stream are scrubbed out. The remaining VOC process gas stream is then carried on to control mixing system 900 via line 394. The addition of three way proportional control valves 386 allows one scrubber 300C to be brought off line for regeneration while allowing continued operation of the system through use of the second scrubber 300C. During the regeneration cycle, warm coolant is carried to a heat exchanger in the bottom of the scrubber unit from radiator system 370 of the ICE 500, thus allowing use of the heat generated by the present invention to be used for regenerative stripping purposes.

In another exemplary embodiment, as shown in FIG. 2C, the glycol condenser unit 300A removes about 10 to about 90 wt % of the VOCs fed to it via input line 305. In other words, the VOCs content of the output stream in condenser output line 394 can be 10 wt % of the VOCs content found in condenser input line 305. Although various equipment and process streams of the above exemplary embodiments are described having certain flow rates and characteristics, it is to be understood that the equipment and process stream can possess other sizes, designs, flow rates, and flow characteristics without deviating from the spirit and scope of the present invention.

In one exemplary embodiment, glycol bath tanks 360 and 360A are insulated and each has an input line and an output line for the glycol bath to be circulated to a refrigeration unit. In one embodiment, the glycol bath in the first glycol bath tank 360 has a first ratio of water to glycol content and the glycol bath in the second glycol bath tank 360A has the same or a different ratio of water to glycol content.

In an exemplary embodiment, both the first and second heat exchangers 380 and 390 are made of stainless steel grade 316 SS. Other materials such as 316 SS equivalents or higher grade materials can also be used to withstand the degradation potential of the condensed VOCs. In one embodiment, a defrost mechanism or cycle is provided to the heat exchangers 380 and 390 using the ICE 500 engine coolant circulated through lines 331 and 332 to heat exchanger 334 in order to prevent the occurrence of VOCs fogging and/or VOCs condensate freezing.

With reference now to FIG. 2E, a process diagram of an exemplary embodiment of the present invention is shown. In the embodiment, the power generated from ICE 500 is used to run a concentrator that uses either a membrane separation device or pressure swing absorption (PSA) device to separate inert gases from the process gas stream and thus concentrate the VOCs in the process gas stream to the point that they support combustion by the ICE 500. Stripped inert gases are vented to atmosphere.

In one exemplary embodiment, heat produced by the ICE 500 is captured in radiator system 370 and circulated via lines 331 and 332 for use as heat trace on process lines on the industrial site. In this fashion, heat generated by the invention is captured and reused to prevent freezing of lines at industrial sites subject to below freezing temperatures. In certain instances natural gas and oil production well sites employ glycol heat trace systems used for the purpose of preventing lines from freezing. It is accomplished by glycol heated by a burner powered by natural gas or electricity. With this embodiment of the invention, the radiator system 370 glycol is combined with the glycol heat trace system on site so that electricity or gas usage is reduced or eliminated by using the BTU value of the waste stream of the combustor. In reverse, if the combustor is shut down for whatever reason, the coolant from the site heat trace system is used to keep the combustor, in the case of the ICE, its engine block, at safe operating conditions.

Similarly, in another exemplary embodiment, engine exhaust heat of embodiments of the present invention is captured for reuse on site (see FIG. 2E). In this embodiment, engine exhaust heat is run through exhaust heat exchanger 815 located downstream of catalytic converter 550. Exhaust heat is captured and circulated through exhaust heat line 820 to various processes on site for use in heating or defrosting applications. Temperature sensor 2006, as monitored by the control mixing system 900, controls circulation of exhaust heat in line 820. In the embodiment shown in FIG. 2E, exhaust heat in line 820 is used for evaporative use on process or produced waste water from oil/natural gas production fields.

With reference now to FIG. 2G, a process diagram of an exemplary embodiment of the present invention is shown. In the embodiment, power generated by ICE 500 operates a concentrator that uses adsorption media to concentrate VOCs in the process gas stream, and when the VOCs are desorbed, the VOCs are used as combustible fuel by the ICE 500.

In one exemplary embodiment, a pair of adsorption media units 303 are fed VOCs in a process gas stream from a vacuum tank truck. VOCs are fed to the concentrator 301 via process gas line 305. Adsorption media units 303 are run in parallel so as to allow continued operation of the system during regeneration of one of the media units 303. Three way proportional valves 386, controlled by control mixing system 900, are used to control and isolate one adsorption media unit 303 for regeneration purposes while allowing flow of process gas through the other media unit 303. Process gas with concentrated VOC content is fed downstream from adsorption media units 303 through line 394 to control mixing system 900 for mixing with air/oxygen and alternate fuel to create a combustible fuel mixture for the ICE 500.

In an exemplary embodiment, engine exhaust heat of the system is captured for use in regeneration of the adsorption media found in adsorption media unit 303. In this embodiment, engine exhaust heat is run through exhaust heat exchanger 815 located downstream of catalytic converter 550. Exhaust heat is captured and circulated through exhaust heat line 820 to adsorption media unit 303 in order to regenerate the processing capacity of the media. Temperature sensor 2006 and process control valves 386 are used to monitor and control circulation of exhaust heat in line 820 as controlled by control mixing system 900.

With reference now to FIG. 2H, a process diagram of an exemplary embodiment of the present invention is shown. In the embodiment, the power generated from ICE 500 is used to run a concentrator that uses cryogenic device 304 to concentrate the VOCs in the process gas stream to the point that they are condensed back into liquid state.

In the embodiment, refrigerant unit 350, capable of cryogenic temperatures, is used to concentrate VOCs in greater concentration in the process gas stream fed to cryogenic device 304 via line 305. VOCs condensate that is produced is drained from cryogenic device 304 and fed via line 392 to holding tank 200 for reuse on site. The remaining VOC content process gas stream, if any, is discharged from cryogenic device 304 and carried via line 394 to control mixing system 900 where it is further processed in to a combustible fuel mixture for use by ICE 500. In the embodiment, pressure relief valves 420 and 421 are provided for over pressurization protection of the system.

In one exemplary embodiment, heat produced by the ICE 500 is captured in radiator system 370 and circulated via lines 331 and 332 for use in a defrost cycle for cryogenic device 304. A differential pressure switch and coolant flow valve 415, controlled by control mixing system 900, are used in the defrost cycle of cryogenic device 304.

Referring back to FIG. 2A. At different stages of the remedial operation there may not be enough VOCs and SVOCs in the process gas stream available to fuel the ICE 500, hence an alternate fuel 750 is provided. At startup of the ICE 500, a proportional amount of oxygen from atmospheric air and alternate fuel are mixed by control mixing system 900 to form an adequate, combustible fuel mixture for delivery to the ICE 500. As the remedial operation continues, VOCs are withdrawn from process stream 405 and blended in to the air/fuel supply by control mixing system 900, and accordingly the amount of alternate fuel supplied may be suitably decreased. When the remedial operation reaches a steady state condition and thereafter, the amount of alternate fuel can be decreased even further. Hence at a steady state, the process gas stream can be 99% of the fuel source used to fuel and power the ICE 500.

The alternate fuel can be natural gas, well head gas, propane, refinery gas, or any other suitable fuel that can be used as a fuel supply in a conventional manner. However, in accordance with an embodiment of the present invention, the alternate fuel is propane provided by a portable propane tank 750. The oxygen source can be ambient air. In one exemplary embodiment, air is supplied from an air atmospheric source 730 and is filtered through an air filter 720. In another exemplary embodiment, the oxygen source is stripped oxygen that is a byproduct of a nitrogen producing process by an oxygen-nitrogen separator 650, which will be further discussed below. Similar to previous embodiments, the oxygen-nitrogen separator 650 may also be powered by the electricity generator 800 or hydraulic pump 810 of the remedial system 10.

The ICE 500 is an engine in which the combustion of fuel mixture occurs in an enclosed space. The combustion of the fuel mixture is an exothermic reaction, which creates gases at high temperature and pressure. The expanding hot gases cause movement of solid parts of the engine such as pistons or rotors to create mechanical energy. The mechanical energy can be harvested and converted into electrical energy by a generator 800 and/or into hydraulic energy using a hydraulic pump 810. Alternatively, the mechanical energy can be converted to other forms of energy by other mechanical devices 805 such as a direct drive air compressor 600, for example.

In one embodiment, the provided energy is used to power the condenser unit 300. In another embodiment, the generated energy is used to power an air compressor 600 and an oxygen-nitrogen separator 650. The nitrogen produced by an oxygen-nitrogen separator 650 is used to provide an inert gas blanket on a storage vessel being degassed, on a vacuum tank truck, or on a condenser input line 305, for example. The stripped oxygen produced from the nitrogen producing process is re-introduced down stream of the process to the control mixing system 900. In yet another embodiment, the generated energy is used to power the process compressor 600, which will be described further below.

In one exemplary embodiment, a flame arrestor 710 is provided upstream of the ICE 500 to prevent sparks or flames that may be created from a combustion reaction in the ICE. The flame arrestor 710 absorbs heat from a flashback generated from the ICE and quenches it to a temperature below what is needed for ignition. Hence, the flame arrestor 710 stops the propagation of a deflagration from the ICE 500 from propagating from control mixing system 900 to the fuel sources. In another embodiment, a second and third flame arrestors 710 are provided in line 305 and line 410 to provide additional protection to the designated volatile source 100.

In one exemplary embodiment, a catalytic converter 550 is provided to reduce toxicity of emissions from the ICE 500. In one embodiment, the catalytic converter 550 oxidizes carbon monoxide to carbon dioxide and converts unreacted hydrocarbons to carbon dioxide and water. In another embodiment, the catalytic converter 550 further reduces nitrogen oxides to nitrogen and oxygen.

In one exemplary embodiment, a recirculation line 410 (FIG. 2A) is provided. Recirculation line 410 directs a partial process gas stream from the discharge of optional vacuum pump 400 back to the condenser input line 305 or to volatile source 100. At the initial stage of the remedial operation, vacuum pump 400 draws and discharges a high process gas flow rate. Hence, if the process gas flow rate in process gas input line 405 surpasses the fuel consumption requirement of the ICE 500 and there is an excess of process gas, the excess process gas is then directed back to condenser unit 300. Also in this way, the condenser unit 300 can effectively strip more VOCs from the process gas stream and condense them to condensate as well. In addition, the recirculation line 410 provides some flexibility to control the flow and/or the amount of VOCs that are fed to the ICE 500 to compensate for fluctuations in process operations and/or different demands for electricity or hydraulic power produced by the electric generator 800 or hydraulic pump 810, respectively.

As the remedial operation continues and especially when the system is under vacuum, the vacuum pump 400 may discharge a lower process gas flow rate. At that point, a process control valve 412 in recirculation line 410 closes as controlled by the mixing control system 900 so that all of the discharge from the vacuum pump 400 can be directed to the ICE 500 to meet its fuel consumption need.

In the vacuum tank truck application depicted in FIG. 2B, it should be understood that the condenser, vacuum pump, control mixing system, alternate fuel source, ICE and related equipment may be mounted on the truck for mobile use by the tank truck as needed. In such an arrangement, the system would have to be self contained, but it could then be used for ongoing needs of the truck while it is in transit or being used in other applications that do not require organic volatiles abatement.

In another exemplary embodiment (FIG. 2A), a process compressor 600 is provided to produce high pressure gas that can be routed back to a process line for industrial use or storage. The VOCs from the designated volatile source 100 can be directed to process compressor 600. In one exemplary embodiment, the process compressor 600 begins to operate when the generator 800 or hydraulic pump 810 produces adequate power. At its full capacity, process compressor 600 can generate a stream of pressurized gas at a pressure greater than the line pressure of the existing gas transport line so that the recovered pressurized gas can be routed back to the gas transport pipeline for process distribution or storage.

Referring now to FIG. 2A, another exemplary embodiment of the present invention is shown. Similar to the operation of previously described embodiments, the remedial system 10 of the exemplary embodiment draws a fuel stream of VOCs from a designated source, oxidizes the fuel stream and converts the mechanical energy into other forms of energy suitable to operate the equipment of the remedial system 10 and/or other equipment.

In this embodiment, the designated volatile source is a gas waste stream line 101 that would otherwise go to a flare or atmosphere. Gas waste stream line 101 may initially come from a highly pressurized source, such as an oil and/or natural gas well, for example. In certain embodiments, the pressure of the gas waste stream line 101 is insufficient for introducing the waste gas stream back into a gas transport pipeline. In certain embodiments, there is a pressure decrease in gas waste stream line 101 because some of the high gas pressure was used for ancillary work, such as running pumps. In other embodiments, the liquid product from an oil and/or natural gas well is "flashed" during a liquid phase separation process creating a low pressure gas. In one exemplary embodiment, gas waste stream line 101 directs a portion of the gas flow, via condenser input line 305, to remedial system 10 of the present invention.

Because gas waste stream line 101 may be at high pressure, a pressure reduction valve 105 is provided to reduce the high pressure to a lower suitable pressure. The high pressure gas stream upstream of valve 105 may be used to generate work for driving on site equipment. Downstream of valve 105, the resulting lower pressure gas stream is used as the input stream to the remedial system of the present invention. The reduced pressure process gas stream can be routed to an ICE 500 directly for fuel combustion and energy generation. In one embodiment, the reduced pressure process gas stream is directed to a concentrator unit 301 via a condenser input line 305, as the process gas stream may contain high VOCs or water vapor contents.

In an exemplary embodiment (FIG. 2C), concentrator unit 301 utilizes a glycol bath chiller(s). Similar to the operation of the glycol bath chiller as described previously, the VOCs and water vapor in the process gas stream are directed to a condenser input line 305 that goes to a set of heat exchanger(s) submerged in a glycol bath. As the vapor condenses, its condensate is collected and routed out of the heat exchangers. In an exemplary embodiment, the water condensate is collected and routed to a treatment center via a moisture condensate output line 382. In another exemplary embodiment, the process gas stream is further cooled to condense the VOCs. The condensed VOCs are collected and may be routed to a storage tank 200 via a condensate output line 392.

As a gas stream of uncondensed VOCs in a condenser output line 394 is routed out of condenser unit 300 it is directed to an ICE 500 for harvesting energy. The harvested energy can be used to power and drive a glycol bath of the condenser unit 300 and/or a process compressor 600. As can be seen in FIG. 2A, the process compressor 600 is used to provide the gas stream with sufficient pressure to rejoin an existing gas stream going to reclamation and sale.

Again, although the condenser unit 300 is shown, it is not needed in certain embodiments. For example, the depressurized gas stream from the flare bypass line and downstream of reduction valve 105 can be fed directly via bypass line 411 to control mixing system 900 to operate the ICE 500. The mechanical energy produced by the ICE is harvested and converted to electrical or hydraulic energy by a generator 800 or a hydraulic pump 810. In this exemplary embodiment, the provided energy is used to power process compressor 600 so excess gas can be fed back to the flare and/or to power other equipment as needed. Conventional engines have been powered by well head gas where the fuel supply has been "conditioned" to a spec gas standard requirement, for example, dry, constant BTU/CF content as found in sale gas. In embodiments of the present invention, through the use of control mixing system 900, any waste process gas stream of any BTU content at any pressure or flow rate can be used to operate the system. In other words, minimal sale gas is required to operate the system as compared to conventional engines.

Also, even though a condenser unit 300 is shown schematically in FIG. 2A and discussed above as a method of pre-abatement, it is to be understood that such a schematic representation is intended to represent other types of concentrators as well.

With reference now to FIG. 2C, a process diagram of another exemplary embodiment of the present invention is shown. As can be seen, the designated volatile source 100 in the exemplary embodiment is a storage/process tank 102. In one embodiment, storage/process tank 102 contains combustible organic volatiles, such as butane, found in the head gas portion of the tank (gas layer above the liquid level). Because of the butane in the head gas, nitrogen gas is fed via line 651 to tank 102 to provide an inert nitrogen blanket to reduce the likelihood of an explosion. Traditionally, a vacuum pump is employed to draw a waste process gas stream from the head gas in the storage tank and feed it to an oxidizer. However, because of the low oxygen content in the storage tank head gas, a result of the introduced nitrogen blanket, process air in large volumes has to be added to make the head gas stream combustible. In this embodiment of the present invention, an oxygen-nitrogen gas separator 650 is used to provide both the necessary nitrogen for blanketing the storage/process tank 102 and the oxygen required to make the head gas in the process gas stream combustible. Because what oxygen gas volume stripped off is eventually re-introduced, the air fuel ratio of the process gas stream remains balanced and combustible by the ICE 500.

Similar to the previously described embodiments, remedial system 10 of the exemplary embodiments draws in a stream of head gas from a storage tank and feeds it to mixing chamber 700 as controlled by the control mixing system 900, where appropriate oxygen, air, and alternate fuel may be mixed to supply a combustible fuel to the ICE 500. In one embodiment, the oxygen supplied by the oxygen-nitrogen gas separator 650 is fed directly to an input line 405 through valve 417 as controlled by the control mixing system 900 before the head gas stream reaches the mixing chamber 700.

Also similar to before, the power generated by the ICE 500 is used to run some or all of the process equipment of remedial system 10. In an exemplary embodiment, the generated electric energy is used to run the oxygen-nitrogen gas separator 650. The oxygen produced by oxygen-nitrogen gas separator 650, as discussed before, is fed downstream to the process gas input line 405 to make the head gas stream more combustible. Whereas, the nitrogen produced by the oxygen-nitrogen separator 650 is routed to storage/process tank 102 to provide a nitrogen blanket over the waste water liquid.

Although a condenser may not be needed in the exemplary embodiment, it may be needed in other embodiments. For example, in one embodiment, a stream of head gas is routed to a condenser or glycol chiller to abate some of the organic volatiles and/or to produce a dehumidified head gas stream in line 405. In the exemplary embodiment, the dehumidified head gas stream is then fed to the control mixing system 900, where appropriate oxygen, air, and alternate fuel may be mixed to supply a combustible fuel mixture to the ICE 500.

In a similar embodiment, the ICE 500 is used to produce energy from a production field or volatile source that has high levels of inert gases and low BTU content in the process gas stream. The BTU content of the process gas stream is concentrated in the system to increase the BTU levels of the process gas stream to a level that will support combustion. Power generated by the system is used to run an oxygen-nitrogen separator. Oxygen produced is fed in to the process gas stream downstream of the concentrator, thus producing a combustible fuel stream for the ICE 500. In this way high inert content, low BTU process gas can be reclaimed to generate power to run the system and to create power for use at an industrial site or for sale.

With reference to FIG. 2D, a process diagram of another exemplary embodiment of the present invention is shown. Here the designated volatile source is a fume line that collects gasoline volatiles coming from various gasoline pump stations 103 that are displaced when vehicles are being refueled. Gasoline volatiles contain cancer-causing agents and contribute to the formation of greenhouse gases. Various states regulations require gasoline pump stations to have special nozzles, hoses and pumps to capture gasoline volatiles that are displaced when vehicles are being refueled. Conventionally, the captured gasoline volatiles are rerouted to an underground storage tank, where the volatile fumes are later evacuated and oxidized.

Similar to the previously described embodiments, remedial system 10 of the exemplary embodiments draws in a stream of head gas from the underground storage tank 104 through use of the ICE 500 intake vacuum and/or optional pump 400, which is then fed to control mixing system 900. Control mixing system 900 along with air fuel ratio controller 905 mixes appropriate oxygen, air, head gas, and alternate fuel constituents to produce a combustible fuel for the ICE 500. The ICE 500, in turn, generates mechanical power that may be harvested by an electricity generator 800 and/or hydraulic pump 810 to produce power necessary to run some or all of the process equipment of the remedial system 10. Alternatively, the electric power generated by remedial system 10 can be utilized for other industrial processes on site or put back into an energy grid.

In an exemplary embodiment, the generated electric energy is used to run an oxygen-nitrogen gas separator 650. Although not always required, the oxygen-nitrogen gas separator 650 may be provided to produce an inert nitrogen blanket to the storage tank 104 to dampen the tank's combustion level. The oxygen produced by oxygen-nitrogen gas separator 650 is fed via line 652 to a tie-in point with process gas line 405 immediately upstream of control mixing system 900, where the oxygen and head gas are mixed in order to make a more combustible head gas stream for the ICE 500. Whereas, the nitrogen produced by oxygen-nitrogen separator 650 is routed to tank 104 via line 651 to provide a nitrogen supply for inert blanketing of the head space of the tank.

A concentrator 301 is also provided in one exemplary embodiment. In this embodiment, a stream of head gas is drawn from tank 104 by the intake vacuum of an ICE 500 and/or a vacuum pump 400 to a concentrator 301. The concentrator 301 may be a condenser or a glycol chiller that is used to abate some of the organic volatiles and/or to produce a dehumidified head gas stream in line 394. The liquid condensate produced by the concentrator 301 is routed to a condensate storage tank 200 or back to underground storage tank 104. In the exemplary embodiment, the dehumidified head gas stream 394 is then fed to process gas line 405 and then on to control mixing system 900, where appropriate oxygen, air, and alternate fuel may be mixed to supply a combustible fuel to the ICE 500.

With reference now to FIG. 3, a schematic of control logic of control mixing system 900 is shown. In one exemplary embodiment, control mixing system 900 includes an air fuel controller 905, a mixing chamber 700, control valves 731/751/761 fueling an ICE 500. Controller 905 and control mixing system 900 are designed to control the burn of process gas stream 405 in the ICE 500 in a near stoichiometric reaction that consumes the majority of the organic volatiles in the process gas stream. The process gas stream 405 as previously discussed may come from different designated volatile sources, hence its' exact constituents are not exactly known but it generally includes organic volatiles. In some embodiments as shown in FIG. 2C, the process gas stream may further include inert elements such as carbon dioxide or nitrogen.

As shown in FIG. 3, the ICE 500 is connected to mixing chamber 700, controller 905 and control mixing system 900. Control mixing system 900 is driven by the controller 905. Controller 905 also controls an engine ignition and starter cycle 5002. In one embodiment, information from engine RPM 1005 circuit and exhaust oxygen level 2005 circuit is fed to controller 905 to be processed. Based on the processed information, controller 905 adjusts engine RPM 1005 and the air to fuel ratio to arrive at a stoichiometric combustible fuel stream 760.

In one embodiment, the stoichiometric combustible fuel stream 760 is accomplished by controlling the position of the three valves 731, 751, and 761 mixing chamber 700. Air valve 731 controls the atmospheric air input. Fuel valve 751 controls an alternate fuel from a known source such as a propane tank 750. Process gas valve 761 controls the flow of the process gas 405 that comes from a designated volatile source, as previously discussed.

The three mixing chamber valves each use a proportionally positioned poppet to meter the gas flow and are accurately moved by controller 905. The flow through each of the valves is determined by absolute pressure and the differential pressure across each valve. In all embodiments, the ICE 500 is operated under vacuum. As a result, the engine vacuum sets the pressure on the engine side of all three valves. In one embodiment, the air valve 731 is subjected to an atmospheric pressure on its upstream side. In another embodiment, the upstream side of the fuel valve 751 is slightly above atmospheric pressure. The upstream side of process gas valve 761, on the other hand, can have a wide pressure range ranging from a slightly elevated pressure to atmospheric pressure to vacuum, depending on the condition of the designated volatile source(s).

Operating parameters for running control mixing system 900 are either manually entered by a user via a keypad on user interface 910 (mounted on controller 905) or may be changed through a remote telemetry interface 920 that may use an application program running on a remote computer. The display interface also allows the user to navigate through a menu structure for setting operating gains, limits, and set points. Typical examples of user adjustable set points are the running RPM or the maximum opening position of process gas valve 761.

The basic system sequencing is an aspect of operation of control mixing system 900. Phases of operating control mixing system 900 include engine start, warm up and stabilization, run mode; which includes opening to external inputs and adding engine loads, and engine shutdown.

In one embodiment, before starting the ICE 500 all three valves 731, 751, and 761 are set to a closed position. Air valve 731 and fuel valve 751 are then opened to a pre-set programmable initial position, which may depend on the environmental conditions, fuel type, and/or the type of engine used. Process gas valve 761 remains closed during the start and warm up sequence. A number of interlocks (e.g. engine covers are all closed, ambient LEL is at safe level) are checked to be sure it is safe to crank the engine. Controller 905 then powers the ignition system and activates the starter motor. As the ICE 500 cranks, the fuel valve 751 slowly ramps up and down from a set-point in order to arrive at an ideal starting fuel ratio and engine RPM.

A successful engine start may be detected by monitoring the engine RPM circuit 1005 for speed above a threshold that is determined, in part, by the maximum starter speed. When a start is detected, the starter motor is disengaged and the engine RPM control loop 1000 (FIG. 4) is activated to run the motor at an idle speed. If the engine RPM falls to a stop, controller 905 will pause a few seconds and then restart again.

In one embodiment, the engine RPM control loop 1000 proportionally opens and closes air valve 731 and fuel valve 751 in mixing chamber 700 as necessary to control the ICE 500 to run at the idle set point RPM. If controller 905 detects that the engine is running at a lower speed than the idle set point, it will increase the valve positions for both air valve 731 and fuel valve 751. If the measured RPM is higher than the set point, the valves will move in the closing direction. The proportion of air and fuel immediately after engine start is the proportion setting that was on the two valves 731 and 751 at the time that a start was detected.

In one embodiment, a short time after the engine start is confirmed, the fuel ratio loop 2000 (FIG. 4) is engaged. Fuel ratio loop 2000 compares the engine exhaust oxygen level output signal 2005 against a programmable set point. In one exemplary embodiment, there is a delay before the fuel ratio loop 2000 is engaged because the oxygen sensor 2002 will not function properly until it is hot. Oxygen sensor 2002 is used to determine if the ICE 500 is running too rich, too lean, or near a stoichiometric ratio. The comparable set point allows fine tuning of the ideal engine condition which may be optimized, for example, to accommodate different fuel types and different catalytic converter 500 configurations (see FIG. 2A). If the fuel ratio loop 2000 determines that the engine is running on the lean side, it will increase the proportion of fuel to the ICE 500 by setting fuel valve 751 (FIG. 3) to open to a wider position. Conversely, if the ICE 500 is running too rich, the fuel ratio loop 2000 will decrease the proportion of opening of fuel valve 751 accordingly.

After the ICE 500 has successfully started and stabilized at the idle speed for a programmable period of time, the ICE 500 begins to transition into a running speed phase. At the running speed phase, fuel requirement is typically higher because a higher RPM requires more engine power and more fuel flow through the control mixing system 900. Higher flow and engine power means that more of process gas 405 will be processed by remedial system 10.

In one embodiment, the ICE 500 operates at the running speed for a programmable period of time to allow engine temperature and other running conditions to stabilize. This stabilization time period is important as it allows an accurate determination of the amount of energy required to run at the programmed set point, referred to as the "baseline" condition. Comparison against this baseline condition, as recorded by the control system, may be used to estimate the energy content of the incoming process gas stream 405.

In one embodiment, once the ICE 500 is in a steady running phase, the combustion of the process gas stream 405 can proceed. This is accomplished by slowly opening process gas valve 761 (FIG. 3), which allows the ICE 500 to draw in flow from the process gas stream 405. As the process gas stream 405 enters the ICE 500 the conditions of RPM and fuel ratio may change. These changes can be complex, but both RPM loop 1000 (FIG. 4) and fuel ratio loop 2000 adjust air valve 731 and fuel valve 751 as necessary to keep the ICE 500 running within its correct operating range.

Process gas stream 405 may contain different organic and non organic components (VOCs) that may result in different run conditions. In one embodiment, process gas stream 405 may contain mostly air and hence is very lean. As a result, air valve 731 may move toward a closed position and process gas valve 761 may move toward a more open position to allow more process gas to flow through. In the present embodiment, fuel valve 751 may maintain its position as air valve 731 and process gas valve 761 simply offset where the source of air is coming from. In another embodiment, the process gas stream 405 may contain high organic volatiles hence a rich fuel source. As a result, fuel valve 751, which controls the source of the alternate fuel, begins to close off as process gas valve 761 begins to open more to allow more flow from process gas stream 405. In this embodiment, air valve 731 may not change much because control mixing system 900 is simply exchanging where the source of fuel is coming from. In another exemplary embodiment, the process gas stream 405 may be near the correct fuel ratio. In this case, both air valve 731 and fuel valve 751 may close off as process gas valve 761 may open wider to allow more of the process gas stream 405 to come through.

In yet another exemplary embodiment, process gas stream 405 may contain a high level of inert compounds resulting in low percentage oxygen content. In this exemplary embodiment, both air valve 731 and fuel valve 751 have to be in an open position to maintain an accurate air fuel ratio while doing the additional work of heating the inert compounds and moving more volume through the engine.

The key point is that regardless of the input condition, control mixing system 900 automatically makes adjustments to valves 731, 751, and 761 through operation of the two closed feedback loops, RPM loop 1000 and fuel ratio loop 2000, in order to keep the ICE 500 running at a correct steady state condition.

In certain embodiments, when the ICE 500 is at a steady state condition, process gas valve 761 remains in an open position. The process gas valve 761 open position, however, has to be changed (increased or decreased) when an upset condition such as inadequate fuel ratio and/or flow in the process gas stream 405 or any other change in the process conditions occurs. When any change in process conditions is detected, process gas valve 761 may either be scaled back or forward from its original open position, or in some cases it may be driven back to a closing position. Examples of upset conditions that compel process gas valve 761 to back off or close completely include, but are not limited to; air valve 731 or fuel valve 751 approaches a fully closed position, any of the three valves 731, 751, and 761 exceeds a high limit open position, the performance of engine RPM 1005 is erratic, and/or the engine vacuum level is too low. When air valve 731 approaches a fully closed position, air fuel controller 905 can no longer regulate the engine RPM 1005. Similarly, when fuel valve 751 approaches a fully closed position, controller 905 can no longer regulate engine RPM 1005 or the fuel ratio in fuel stream 760 (FIG. 3).

In certain embodiments, a mechanical load may be connected to the ICE 500. This is done either to generate the necessary power required by remedial system 10 or other process needs and/or to increase the work load and thereby increase the amount of process gas 405 coming in to the system. The mechanical load can be added either before or after process gas valve 761 is opened to allow process gas stream 405 to be processed. The addition of load has the effect of lowering the engine vacuum and thus requiring more work to be done. Increased work requires more fuel flow 760 to the ICE 500. As the ICE 500 is typically supplied primarily with fuel from process gas valve 761, the net result is the processing of an additional volume of process gas 405 in a given period of time. More load means more work and results in more of process gas 405 being remediated. Again, the presence of RPM loop 1000 and fuel ratio loop 2000 makes control mixing system 900 insensitive to changes in either the content of the gas process stream 405 or to the applied load and allows proper functioning of remedial system 10.

In a shutdown mode, if a load had been applied it is now removed before process gas valve 761 is shut off. Process gas valve 761 is slowly closed off to be in sync with the opening of air valve 731 and fuel valve 751. The closing and opening synchronization of the three valves 731, 751, and 761 is important to maintain a smooth engine operation as control mixing system 900 switches the air/fuel components in engine fuel stream 760 from process gas stream 405 to the air source 730 and alternate fuel source 750. As process gas valve 761 is fully shut off, air valve 731 and fuel valve 751 begin to slowly and proportionally close to taper off and eventually stop fuel stream 760 that is routed to the ICE 500. When RPM 1005 has dropped to zero and all three valves are closed, the ignition system is then switched off. In one embodiment, each process of removing the load and switching the valves can be done in several seconds.

With reference now to FIG. 4, a control algorithm for control mixing system 900 includes RPM loop 1000, fuel ratio loop 2000, and the valve biasing loop 3000. In one embodiment, as previously discussed, the engine RPM 1005 is controlled by the positions of air valve 731 and fuel valve 751. If the positions of the valves are over the normal operating range, excess flow to the ICE 500 and higher engine RPM 1005 may result. To control the engine RPM 1005, it must first be measured. In one embodiment, the RPM 1005 is measured based on the ignition coil input which may pulse once per two engine revolutions per cylinder. The RPM filter block 1001 keeps a running average of the last several pulse times. The length of the running buffer is set equal to the number of cylinders so that slight variations in pulse times from cylinder to cylinder will not cause unnecessary noise in the RPM result. The RPM is calculated as 120/the number of cylinders/the pulse time.

The difference between target RPM 1006 and measured engine RPM 1005 creates an error that is multiplied by gain 1002. That result becomes the key component in an output that is then limited to become valve error 1003. An additional input to the valve error 1003 calculation is the first time derivative of the engine RPM 1005 multiplied by the gain KDrpm 1004. The first time derivative of RPM is calculated by taking the difference between the present RPM and the previously calculated RPM and it is a measure of how fast the RPM is changing. The addition of this term provides stabilizing damping to RPM control loop 1000.

The resulting valve error 1003 signal is proportionally scaled by an engine valve bias 3001 signal to directly create the air valve position command 7310. Valve position command 7310 is limited to prevent impossible to achieve negative commands and to not allow the valve to open beyond a reasonable control range for the engine.

Fuel valve position command 7510 is similarly processed from the same valve error 1003 signal so that air valve 731 and fuel valve 751 will always be proportionally commanded from the RPM loop 1000 control error signal. Fuel valve 761 has an additional input from the fuel error signal 2001, but from the perspective of the RPM error signal, these changes are separate.

Similarly to RPM loop 1000, fuel ratio loop 2000 controls the engine fuel ratio by adjusting process gas fuel valve position 7610 (FIG. 5) on top of its command from RPM loop 1000. To create fuel valve command 7510, the measured effectiveness of the engine burn is detected by oxygen sensor 2002 (FIG. 3). Engine exhaust oxygen sensor output 2005 is compared to oxygen target value 2003 by taking the difference between the two. That difference error is multiplied by gain $KO_2$ 2004 and input into time domain integrator 2100. The output of time domain integrator 2100 is limited to become fuel error 2001. Time domain integrator 2100 in this control loop serves two key purposes. The first is to filter incoming error because sensor gain is so high that direct usage would result in a highly unstable control loop. The second purpose is to assure a very low steady state error in the desired (target) command value in control loop 2000. The resulting fuel error 2001 is added to valve error 1003 from the RPM loop 1000 to produce the proportional fuel valve command 7510.

Valve biasing control loop 3000 compares valve error 1003 against a target valve command 3003. The result is passed through gain (KGAUG) 3002, integrator 3100 and limited by bias limiter 3004 to produce an engine valve bias signal 3001. Engine valve bias signal 3001 proportionally adjusts air valve command 7310 and fuel valve command 7510 over a very limited range that is determined by bias limiter 3004.

Although it is subtle, valve biasing loop 3000 provides a small bias to the control valves that drives the RPM loop 1000 steady state error to zero in a way that does not significantly affect the performance of RPM loop 1000 and fuel ratio loop 2000. The significance of clearing the RPM steady state error to zero in this way is that it effectively changes the gain of RPM loop 1000 and fuel ratio loop 2000 as a function of valve position. Thus increased gain for increased valve position greatly improves performance of remedial system 10 over the broad range of variation in process gas components and engine loads.

With reference to FIG. 5, the control algorithm for operating process gas valve 761 is shown. The operation of process gas valve 761 is independent of air valve 731 and fuel valve 751 because of the closed loop nature of operation for valves 731 and 751. While the operation of process gas valve 761 may cause a response from air valve 731 and fuel valve 751, process gas valve 761 can continue to open as long as the engine performance does not reach its operating range limits. Process gas valve 761 remains open until or unless any of air valve command 7310, fuel valve command 7510, process gas valve command 7610, engine RPM control loop 1000 and/or engine vacuum pressure reaches or exceeds its correct operating range.

As can be seen in FIG. 5, as long as none of the nine "out of range" conditions are met, none of the "out of range" switches are closed, and therefore the only input to process gas valve command integrator 7600 is the process gas increment gain 7601. Process gas valve 761 will continue to operate in the open direction until one or more of the "out of range" decisions are true. Notice that a true decision closes a switch that subtracts process gas increment gain 7601, multiplied by a gain Δ, away from the process gas increment gain 7601 setting that drives integrator 7600. In all cases but one, the gain A is greater than one with the result that integrator 7600 will reverse direction, thus commanding process gas valve 761 towards the closed direction. The logic control concept is that a reduction of the process gas valve command 7610 should take away the "out of range" condition. The only decision with a gain A of one is found when process gas valve command 7610 has hit its limit. Because the gain A is one, the net result of this occurrence is a canceled input to integrator 7600 which results in no change to process gas valve command 7610.

In FIG. 3, fuel usage/bypass feedback loop 8000 is shown. Fuel usage feedback/bypass loop 8000 allows a portion of process gas to bypass concentrator 301 and be fed directly via line 411 to control mixing system 900 and ICE 500. The VOC content of the process gas stream that is being processed typically is variable in nature. If the VOC BTU content is greater than BTU combustion capacity of the system then all the process gas stream is fed to the concentrator and then to the ICE; if the VOC BTU content is lower than the BTU combustion capacity, then the appropriate portion of the gas stream is automatically routed via bypass line 411 to control mixing system 900 via bypass control valve 413. Fuel usage feedback loop 8000 accomplishes this task by monitoring alternate fuel valve 751 and controlling bypass control valve 413. Control mixing system 900 is constantly monitoring and controlling the position of alternate fuel valve 751 during operation of the ICE 500. If alternate fuel valve 751 is trending towards a closed position, indicating a higher VOC content in the process gas, control mixing system 900 registers this and moves bypass control valve 413 to a more closed position. Conversely, if alternate fuel valve 751 is trending towards the open position, indicating a lower VOC content in the process gas stream, control mixing system 900 will move bypass control valve 413 towards a more open position. As bypass control valve 413 moves from a more open to a more closed position, the amount of process gas stream going in to concentrator 301 is adjusted automatically, thus allowing more or less of the VOC laden process gas stream to be concentrated. As bypass control valve 413 moves towards a more closed position, more process gas will be run through concentrator 301 and the VOC level on the process gas stream reduced as VOCs are removed from the gas stream by the concentrator. The purpose of fuel usage feed back loop 8000 is to minimize alternate fuel use of the system.

With reference to FIG. 3, the pressure feedback loop 8500 is shown. The pressure feedback loop, as controlled by control mixing system 900, provides process control for three important functions of the system. A first function of pressure feedback loop 8500 is to allow recirculation of process gas from control mixing system 900 back to the volatile source. If control mixing system 900 registers that the incoming process gas stream has more BTU value than the ICE 500 combustion capacity, it will close process valve 413 as previous described, and divert and circulate the process gas stream back to the volatile source. Control mixing system 900 monitors pressure vacuum switch 430 and when pressure is higher than a predetermined set point, control mixing system 900 opens process control valve 412 and allows process gas to flow back via line 410 to the volatile source. In this fashion, excessive VOC levels (high BTU value) in the process gas stream to control mixing system 900 are re-circulated for multiple passes. In another embodiment of this control loop a portion of the required vacuum work (engine manifold vacuum pressure 765) is transferred from the engine intake manifold to pump 400 whereas pump 400 reduces pressure at the mixing chamber 700 specifically to the benefit of process gas valve 761. This results in a more stable control of the process gas valve 761 in that pump 400 becomes the majority vacuum source instead of the intake engine manifold vacuum 765 resulting in a higher resolution for process gas valve 761. This also results in increased vacuum capacity for a system with two vacuum pumps 400 and 500/765 plumbed in series.

A second function of pressure feedback loop 8500 is control for various defrost applications of a system. In one embodiment as shown in FIG. 2B, control mixing system 900 utilizes pressure feedback loop 8500 to monitor and control two differential pressure switches 375 associated with heat exchangers 315. When pressure higher than a predetermined set point is determined in either of heat exchangers 315, control mixing system 900 manages process flow valve 414 and coolant flow valve 415 so as to control process flow and coolant flow through the heat exchangers 315 that requires defrosting. When pressure from pressure differential switch 375 drops below the predetermined set point, the process flow valve and coolant flow valve return to normal operating position.

In another embodiment as shown in FIG. 2D, pressure feedback loop 8500 is used to enable control of a defrost cycle for heat exchanger 300B. If control mixing system 900 registers a higher pressure on differential pressure switch 375 than a predetermined set point, it will throttle down the three way proportional control valves 386 and thus reduce the flow of refrigerant through heat exchanger 300B. With less refrigerant flow through heat exchanger 300B, it will warm up and defrost. Once pressure has dropped below a predetermined set point, control mixing system 900 opens up proportional control valves 386 and allows higher refrigerant flow through heat exchanger 300B.

In another embodiment as shown on FIG. 2H, pressure feedback loop 8500 is used to monitor and control a defrost application for cryogenic device 304. If control mixing system 900 registers a higher pressure on differential pressure switch 375 than a predetermined set point, it will open up process flow valve 414 and allow flow of warm engine coolant from radiator system 370 to circulate via lines 331 and 332 through a heat exchanger adjacent to the cryogenic device 304. Once pressure has dropped below a predetermined set point, indicating a defrosted heat exchanger, control mixing system 900 closes process flow valve 414 to isolate the defrost heat exchanger from radiator system 370.

A third function is shown in FIG. 2B, pressure feedback loop 8500 is used to control an adjustable orifice valve 440 to maintain a programmable vacuum level on the entire process gas supply of the system. If control mixing system 900 registers a pressure outside the programmed set point based on pressure transducer 430, it will open or close the adjustable orifice valve 440 and thus reduce or increase process flow to maintain programmed vacuum.

In FIG. 3, temperature feedback loop 9000 is shown. Temperature feedback loop 9000 is used for control of various defrost and heat demand applications for embodiments of the present invention. In one embodiment as shown in FIG. 2A, control mixing system 900 utilizes temperature feedback loop 9000 to monitor and control coolant flow valve 415 delivering coolant to heat exchanger 330. When temperature higher than a predetermined set point is sensed at temperature sensors 2006, control mixing system 900 opens coolant flow valve 415 to allow flow of coolant from radiator system 370 and defrosting of heat exchanger 330. When control mixing system 900 senses temperature is below the predetermined set point, control mixing system 900 then closes valve 415 to stop coolant flow to defrosted heat exchanger 330.

In another embodiment as shown in FIG. 2C, temperature feedback loop 9000 is used to enable control of a defrost cycle for heat exchanger 334. If control mixing system 900 registers a higher temperature on either of temperature sensor 2006 than a predetermined set point, it opens coolant valve 415 to allow flow of coolant from radiator system 370 and defrosting of heat exchanger 334. When control mixing system 900 senses temperature is below the predetermined set point, control mixing system 900 then closes valve 415 to stop coolant flow to defrosted heat exchanger 334.

As shown in various figures (FIGS. 2A, 2B, 2C, 2D, 2H) control mixing system 900 also uses temperature feedback loop 9000 to monitor and control operation of refrigeration unit 350. When temperature drops below a predetermined set point, as read by sensors 2006, control mixing system 900 turns on refrigeration unit 350 to start coolant flow through an associated heat exchanger. When the temperature drops below a predetermined set point, control mixing system 900 then turns off refrigeration unit 350.

In another embodiment as shown in FIG. 2E, temperature feedback loop 9000 is used to enable control of two different applications requiring heat. The first application utilizes heat from radiator system 370 to provide heated glycol coolant for heat tracing of process lines associated with a glycol heat trace system at a production well/production field. If control mixing system 900 registers a demand for heat based on a predetermined set point, it opens coolant valve 415 to allow flow of coolant from radiator system 370 and coolant flow through the heat traced lines.

The second application requiring heat in FIG. 2E is one where heat is required for evaporative uses in water pollution remediation. If control mixing system 900 registers a higher temperature on temperature sensor 2006 than a predetermined set point, it opens exhaust heat exchanger valve 416 to allow flow of heated atmospheric air from exhaust heat exchanger 815 and flow via line 820 to the remediation process. When control mixing system 900 senses temperature is below the predetermined set point, control mixing system 900 then closes valve 416 to control flow to the remediation process. In other embodiments for water pollution remediation, it should be understood that heat source from radiator system 370 or other heat sources from embodiments of the invention may be used for such remedial processes.

In FIG. 3, the oxygen content feedback loop 9500 is shown. Oxygen content feedback loop 9500 allows control mixing system 900 to monitor and provide oxygen to the process gas stream 405 and ICE 500. The VOC and inert gas content of the process gas stream that is being processed typically is variable in nature. If the process gas stream has too high an inert gas content (lack of oxygen), the addition of oxygen is required to support combustion by the system. Control mixing system 900 monitors three different parameters in order to determine the oxygen requirement of the process gas stream being processed by embodiments of the current invention. The position of air valve 731, the ICE 500 exhaust gas temperature 2006 and ICE 500 engine manifold vacuum pressure 765 are simultaneously monitored and compared to baseline parameters to determine the oxygen requirement of the incoming process gas stream 405. If additional oxygen is required for proper combustion, control mixing system 900 opens oxygen content control valve 417 and allows oxygen generated by oxygen-nitrogen separator 650 to flow to process gas line 405 and control mixing system 900 where the oxygen is combined with atmospheric air, alternate fuel and process gas to produce a combustible gas mixture for ICE 500. Another embodiment of the control loop would be to use a direct measurement of oxygen level with an inline O2 sensor in process gas line 405, also monitored by control mixing system 900 to provide a comparison value of the oxygen content in lieu of or in conjunction with the three baseline parameters of air valve 761 position, exhaust gas temperature and engine manifold vacuum pressure.

Example 1

Remedial system 10 can be used in any number of various applications where there is a source of organic volatiles, VOCs. For example, it has been found that process gas that is routed to a flare for oxidation can instead be treated with remedial system 10 of the present invention and electricity generated as a byproduct of the inventions' oxidation process. In one exemplary embodiment, about 20% of a 60 SOW process gas stream going to a flare for oxidation is diverted to the remedial system. The diverted process gas stream is hooked up directly to an ICE 500. Control mixing system 900 and air fuel controller 905 on the ICE 500 creates a mix of about 99% of the process gas and 1% of propane alternate fuel to form a mixed fuel for combustion by the ICE 500. In the exemplary embodiment, the ICE 500 then is used to run a generator which produces between 25 to 40 kW of usable electricity for the site. In another embodiment, no gas will be directed to flare in favor of the invention operating a gas pumping station and putting waste gas back into the pipeline for sale.

Example 2

In another exemplary embodiment, a process gas stream is directed to the condenser unit of the present invention. The condenser unit removes about 10 to 20% of the VOCs and SVOCs in the process gas stream at the initial stage of operation of the remedial system. At the steady state condition of remedial system 10, the condenser removes about 20% to 90% of the VOCs (depending on VOC type) in the process gas stream before it reaches the ICE 500. The net result, following oxidation by the ICE 500, is over 99.9% removal of VOCs in the process gas stream. In this exemplary embodiment, the ICE 500 is a single engine rated at less than 50 brake horsepower (BHP). Although an ICE with a larger engine or multiple engines can be used, it may not be necessary since the condenser unit removes most of the volatile contents from the process gas stream.

In view of the foregoing, an embodiment of the present invention provides a remedial system that has a concentrator adapted to remove a portion of a fuel supply obtained from a VOC laden source and an ICE for converting the remaining fuel supply to a useable form of energy. In another embodiment, the remedial system includes a control mixing system adapted to regulate extreme fluctuations in energy density and/or flow of the process gas stream and provide a constant feed and/or a constant fuel concentration to the ICE. In a further embodiment, the remedial system includes both a concentrator and a control mixing system adapted to regulate the flow of fuel to an ICE. In certain embodiments, the concentrator is a condenser that removes moisture and/or condenses organic volatiles from a VOC laden source.

In the above exemplary embodiments, the remedial systems of various embodiments of the present invention produce less greenhouse gas emissions and have a smaller carbon footprint than other traditional oxidation systems while reclaiming and converting renewable energy to other forms of useable energy. Embodiments of the present invention have been accepted and operating permits issued for use in air pollution control districts (i.e. 11 permits issued by the South Coast Air Quality Management District in California), New Jersey, Texas and elsewhere. Embodiments of the invention are used in place of other pollution control technologies that will not meet current EPA or local emission regulations.

While particular process equipment and methods have been described in connection with what is presently considered to be practical exemplary embodiments, it is to be understood that the invention is not limited to the disclosed embodiments, but, on the contrary, is intended to cover various modifications and equivalent arrangements and equivalents thereof.

| PATENT DRAWING NUMBERS | |
|---|---|
| 10 | REMEDIATION SYSTEM |
| 100 | Vapor Source Line |
| 101 | Gas Waste Stream |
| 102 | Above Ground Storage Tank |
| 103 | Gasoline Pump Stations |
| 104 | Underground Storage Tank |
| 105 | Pressure Reduction Valve |
| 110 | Check Valve |
| 180 | Liquid Vapor Separator |
| 200 | Holding Tank |
| 250 | Pump |
| 300 | Condenser Unit |
| 300A | Glycol Condenser Unit |
| 300B | Shell & Tube Heat Exchanger |
| 300C | Scrubber |
| 301 | Concentrator |
| 302 | Membrane |
| 303 | Adsorption Media |
| 304 | Cryogenic Device |
| 305 | Condenser Input Line |
| 310 | Cooling Coils |
| 315 | Heat Exchanger |
| 320 | Fan |
| 325 | Cooling Fan |
| 330 | Heat Exchanger |
| 331 | Input Line |
| 332 | Output Line |
| 333 | To Heat Trace |
| 334 | Heat Exchanger (ICE coolant) |
| 340 | Cooling Coils |
| 344 | Bypass Line |
| 345 | Temperature Control Valve |
| 350 | Refrigeration Unit |
| 355 | Coolant Holding Tank |
| 360 | Glycol Bath Tank |
| 360A | Glycol Bath Tank |
| 370 | Radiator System |
| 375 | Pressure Differential Switch |
| 380 | Heat Exchanger |
| 382 | Moisture Condensate Line |
| 383 | Coolant Return |
| 384 | Dehumidified Vapor Line |
| 386 | Three Way Proportional Control Valve |
| 390 | Heat Exchanger |
| 392 | Condensate Line |
| 393 | Coolant Input |
| 394 | Condenser Output |
| 400 | Vacuum Pump |
| 405 | Process Gas Line |
| 410 | Recirculation Line |
| 411 | Bypass Line |
| 412 | Process Control Valve |
| 413 | Bypass Control Valve |

-continued

| PATENT DRAWING NUMBERS | |
|---|---|
| 414 | Process Flow Valves |
| 415 | Coolant Flow Valves |
| 416 | Exhaust Heat Exchanger Valve |
| 417 | Oxygen Enrichment Valve |
| 420 | Pressure Relief Valve 5 psi |
| 421 | Pressure Relief Valve 2 psi |
| 430 | Pressure Tranducer |
| 440 | Adjustable Orifice Valve |
| 500 | ICE Internal Combustion Engine |
| 525 | Engine Exhaust Line |
| 550 | Catalytic Converter |
| 560 | Work Load |
| 600 | Process Compressor |
| 650 | Oxygen-Nitrogen Separator |
| 651 | Nitrogen Line |
| 652 | Oxygen Line |
| 700 | Mixing Chamber |
| 710 | Flame Arrestor |
| 712 | Alternate Fuel Supply Line |
| 713 | Alternate Fuel Supply Solenoid Valve |
| 720 | Air Filter |
| 730 | Atmospheric Air Source |
| 731 | Air Control Valve |
| 740 | Flow Meter |
| 745 | Flow Totalizer |
| 746 | Regulator |
| 750 | Alternate Fuel Source (Propane Tank) |
| 751 | Alternate Fuel Control Valve |
| 760 | Combustible Fuel Stream |
| 761 | Process Gas Control Valve |
| 765 | Engine Manifold Pressure |
| 800 | Electrical Generator |
| 805 | Mechanical Devices |
| 810 | Hydraulic Pump |
| 815 | Exhaust Heat Exchanger |
| 820 | Exhaust Heat Line |
| 900 | Control Mixing System |
| 905 | Air Fuel Controller |
| 910 | User Interface at Controller |
| 920 | Remote Telemetry Interface |
| 1000 | Engine RPM Control Loop |
| 1001 | RPM Filter Block |
| 1002 | Gain KRPM |
| 1003 | Valve Error |
| 1004 | Gain KDRPM |
| 1005 | Engine RPM |
| 1006 | Target RPM |
| 2000 | Fuel Ratio Control Loop |
| 2001 | Fuel Error Signal |
| 2002 | Oxygen Sensor |
| 2003 | Oxygen Target Value |
| 2004 | Gain KO2 |
| 2005 | Exhaust O2 Level Output |
| 2006 | Temperature Sensor |
| 2100 | Time Domain Integrator |
| 3000 | Valve Biasing Control Loop |
| 3001 | Engine Valve Bias Signal |
| 3002 | Gain KGAUG |
| 3003 | Target Valve Command |
| 3004 | Bias Limiter |
| 3100 | Valve Biasing Integrator |
| 7310 | Air Valve Command |
| 7510 | Fuel Valve Command |
| 7600 | Process Gas Valve Command Integrator |
| 7601 | Process Gas Increment Gain |
| 7610 | Process Gas Valve Command |
| 8000 | Fuel Usage Feed Back Loop |
| 8500 | Pressure Feedback Loop |
| 9000 | Temperature Feedback Loop |
| 9500 | Oxygen Content Feedback Loop |

What is claimed is:

1. A remedial system for treating volatile organic compounds comprising:
a concentrator input line to receive volatile organic compounds from a source;
a concentrator connected to the concentrator input line, the concentrator having a liquid output line and a vapor fuel output line;
a mixing chamber to receive an air supply line, an alternate fuel supply line and the vapor fuel output line, wherein the mixing chamber has a mixed fuel outlet line;
a control mixing system having a valve in the air supply line, a valve in the alternate fuel supply line, and a valve in the vapor fuel output line and an air fuel controller to control the flow through those valves to blend the air and fuel without reformation to keep a ratio of air and fuel in the mixed fuel outlet line at or near a stoichiometric air to fuel ratio;
an internal combustion engine configured to receive the mixed fuel outlet line; and
a feed pump having a pump inlet and a pump output line, wherein the pump inlet is connected to the vapor fuel output line.

2. The system of claim 1, further comprising a recycle line connected from the pump output line to the concentrator input line.

3. A remedial system for treating volatile organic compounds comprising:
a concentrator input line to receive volatile organic compounds from a source;
a concentrator connected to the concentrator input line, the concentrator having a liquid output line and a vapor fuel output line;
a mixing chamber to receive an air supply line, an alternate fuel supply line and the vapor fuel output line, wherein the mixing chamber has a mixed fuel outlet line;
a control mixing system having a valve in the air supply line, a valve in the alternate fuel supply line, and a valve in the vapor fuel output line and an air fuel controller to control the flow through those valves to blend the air and fuel without reformation to keep a ratio of air and fuel in the mixed fuel outlet line at or near a stoichiometric air to fuel ratio;
an internal combustion engine configured to receive the mixed fuel outlet line; and
a compressor having a compressor input line and a compressor output line, wherein the compressor input line is connected to the source.

4. A remedial system for treating volatile organic compounds comprising:
a concentrator input line to receive volatile organic compounds from a source;
a concentrator connected to the concentrator input line, the concentrator having a liquid output line and a vapor fuel output line;
a mixing chamber to receive an air supply line, an alternate fuel supply line and the vapor fuel output line, wherein the mixing chamber has a mixed fuel outlet line;
a control mixing system having a valve in the air supply line, a valve in the alternate fuel supply line, and a valve in the vapor fuel output line and an air fuel controller to control the flow through those valves to blend the air and fuel without reformation to keep a ratio of air and fuel in the mixed fuel outlet line at or near a stoichiometric air to fuel ratio;
an internal combustion engine configured to receive the mixed fuel outlet line; and
a compressor having a compressor input line and a compressor output line, wherein the compressor output line is connected to an oxygen-nitrogen separator.

5. A remedial system for treating volatile organic compounds comprising:
- a concentrator input line to receive volatile organic compounds from a source;
- a concentrator connected to the concentrator input line, the concentrator having a liquid output line and a vapor fuel output line;
- a mixing chamber to receive an air supply line, an alternate fuel supply line and the vapor fuel output line, wherein the mixing chamber has a mixed fuel outlet line;
- a control mixing system having a valve in the air supply line, a valve in the alternate fuel supply line, and a valve in the vapor fuel output line and an air fuel controller to control the flow through those valves to blend the air and fuel without reformation to keep a ratio of air and fuel in the mixed fuel outlet line at or near a stoichiometric air to fuel ratio;
- an internal combustion engine configured to receive the mixed fuel outlet line; and
- a generator to convert energy produced by the internal combustion engine into electricity.

6. A remedial system for treating volatile organic compounds comprising:
- a concentrator input line to receive volatile organic compounds from a source;
- a concentrator connected to the concentrator input line, the concentrator having a liquid output line and a vapor fuel output line;
- a mixing chamber to receive an air supply line, an alternate fuel supply line and the vapor fuel output line, wherein the mixing chamber has a mixed fuel outlet line;
- a control mixing system having a valve in the air supply line, a valve in the alternate fuel supply line, and a valve in the vapor fuel output line and an air fuel controller to control the flow through those valves to blend the air and fuel without reformation to keep a ratio of air and fuel in the mixed fuel outlet line at or near a stoichiometric air to fuel ratio;
- an internal combustion engine configured to receive the mixed fuel outlet line; and
- a hydraulic pump to convert energy produced by the internal combustion engine into hydraulic power.

7. The system of claim 6, wherein the hydraulic pump is capable of generating hydraulic power to power the concentrator and operate all related equipment.

8. A remedial system for treating volatile organic compounds comprising:
- a concentrator input line to receive volatile organic compounds from a source;
- a concentrator connected to the concentrator input line, the concentrator having a liquid output line and a vapor fuel output line;
- a mixing chamber to receive an air supply line, an alternate fuel supply line and the vapor fuel output line, wherein the mixing chamber has a mixed fuel outlet line;
- a control mixing system having a valve in the air supply line, a valve in the alternate fuel supply line, and a valve in the vapor fuel output line and an air fuel controller to control the flow through those valves to blend the air and fuel without reformation to keep a ratio of air and fuel in the mixed fuel outlet line at or near a stoichiometric air to fuel ratio; and
- an internal combustion engine configured to receive the mixed fuel outlet line,
- wherein the concentrator is a membrane separator device.

9. A remedial system for treating volatile organic compounds comprising:
- a concentrator input line to receive volatile organic compounds from a source;
- a concentrator connected to the concentrator input line, the concentrator having a liquid output line and a vapor fuel output line;
- a mixing chamber to receive an air supply line, an alternate fuel supply line and the vapor fuel output line, wherein the mixing chamber has a mixed fuel outlet line;
- a control mixing system having a valve in the air supply line, a valve in the alternate fuel supply line, and a valve in the vapor fuel output line and an air fuel controller to control the flow through those valves to blend the air and fuel without reformation to keep a ratio of air and fuel in the mixed fuel outlet line at or near a stoichiometric air to fuel ratio; and
- an internal combustion engine configured to receive the mixed fuel outlet line,
- wherein the concentrator is a cryogenic device.

10. A remedial system for treating volatile organic compounds comprising:
- a concentrator input line to receive volatile organic compounds from a source;
- a concentrator connected to the concentrator input line, the concentrator having a liquid output line and a vapor fuel output line;
- a mixing chamber to receive an air supply line, an alternate fuel supply line and the vapor fuel output line, wherein the mixing chamber has a mixed fuel outlet line;
- a control mixing system having a valve in the air supply line, a valve in the alternate fuel supply line, and a valve in the vapor fuel output line and an air fuel controller to control the flow through those valves to blend the air and fuel without reformation to keep a ratio of air and fuel in the mixed fuel outlet line at or near a stoichiometric air to fuel ratio;
- an internal combustion engine configured to receive the mixed fuel outlet line; and
- a process gas valve and a vacuum pump in the vapor fuel output line, and a pressure differential control loop, wherein the process gas valve is opened and closed proportionately, as controlled by the pressure differential control loop, in order to control the vacuum pump and thus increase vacuum capacity of the system.

11. A remedial system for treating volatile organic compounds comprising:
- a concentrator input line to receive volatile organic compounds from a source;
- a concentrator connected to the concentrator input line, the concentrator having a liquid output line and a vapor fuel output line;
- a mixing chamber to receive an air supply line, an alternate fuel supply line and the vapor fuel output line, wherein the mixing chamber has a mixed fuel outlet line;
- a control mixing system having a valve in the air supply line, a valve in the alternate fuel supply line, and a valve in the vapor fuel output line and an air fuel controller to control the flow through those valves to blend the air and fuel without reformation to keep a ratio of air and fuel in the mixed fuel outlet line at or near a stoichiometric air to fuel ratio;
- an internal combustion engine configured to receive the mixed fuel outlet line; and
- an adjustable orifice valve, mounted in the concentrator input line close to the source, and a process vacuum control loop to maintain required vacuum capacity in the system.

12. A remedial system for treating volatile organic compounds comprising:
- a concentrator input line to receive volatile organic compounds from a source;
- a concentrator connected to the concentrator input line, the concentrator having a liquid output line and a vapor fuel output line;
- a mixing chamber to receive an air supply line, an alternate fuel supply line and the vapor fuel output line, wherein the mixing chamber has a mixed fuel outlet line;
- a control mixing system having a valve in the air supply line, a valve in the alternate fuel supply line, and a valve in the vapor fuel output line and an air fuel controller to control the flow through those valves to blend the air and fuel without reformation to keep a ratio of air and fuel in the mixed fuel outlet line at or near a stoichiometric air to fuel ratio; and
- an internal combustion engine configured to receive the mixed fuel outlet line,
- wherein the concentrator is to reduce the BTU content (energy) of the source so as to allow a lower rated BHP internal combustion engine to combust volatile organic compounds.

\* \* \* \* \*